US012631892B2

(12) United States Patent
Kuwana et al.

(10) Patent No.: US 12,631,892 B2
(45) Date of Patent: May 19, 2026

(54) OPTICAL SYSTEM AND SPECIMEN ANALYZER

(71) Applicant: ThinkCyte K.K., Tokyo (JP)

(72) Inventors: Takuya Kuwana, Kobe (JP); Takeshi Sugiyama, Kobe (JP); Kazuhiro Yamada, Kobe (JP); Ayato Tagawa, Kobe (JP)

(73) Assignee: THINKCYTE K.K., Tokyo (JP)

( * ) Notice: Subject to any disclaimer, the term of this patent is extended or adjusted under 35 U.S.C. 154(b) by 58 days.

(21) Appl. No.: 18/495,946

(22) Filed: Oct. 27, 2023

(65) Prior Publication Data

US 2024/0142789 A1 May 2, 2024

(30) Foreign Application Priority Data

Nov. 2, 2022 (JP) ................................. 2022-176767

(51) Int. Cl.
    *G02B 27/42* (2006.01)
    *G01N 15/01* (2024.01)
    (Continued)

(52) U.S. Cl.
    CPC ..... *G02B 27/4205* (2013.01); *G01N 15/1436* (2013.01); *G01N 15/1459* (2013.01); *G01N 15/01* (2024.01)

(58) Field of Classification Search
    CPC ........... G02B 27/4205; G01N 15/1436; G01N 15/1459; G01N 15/01; G01N 15/1429; G01N 15/1434; G01N 2015/1006
    (Continued)

(56) References Cited

U.S. PATENT DOCUMENTS

| | | | | |
|---|---|---|---|---|
| 2005/0280794 A1* | 12/2005 | Tsuji | ................... | G03F 7/70191 |
| | | | | 355/53 |
| 2016/0370280 A1 | 12/2016 | Yamamoto et al. | | |
| 2017/0102339 A1* | 4/2017 | Honda | ...................... | G01J 1/44 |

FOREIGN PATENT DOCUMENTS

| | | |
|---|---|---|
| JP | 2014-209237 A | 11/2014 |
| JP | 5849954 B2 | 2/2016 |

(Continued)

OTHER PUBLICATIONS

Office Action issued on Mar. 3, 2026 by the Japan Patent Office in corresponding Japanese Patent Application No. 2022-176767 with English summary (11 pages).

*Primary Examiner* — Md M Rahman

(74) *Attorney, Agent, or Firm* — BUCHANAN INGERSOLL & ROONEY PC

(57) ABSTRACT

Disclosed is an optical system including: a light source configured to emit light; an irradiation optical system including a diffractive optical element on which the light is incident, the irradiation optical system being configured to apply illumination light in which a plurality of diffracted lights generated by the diffractive optical element are distributed; a flow cell in which a sample containing cells is caused to flow to a position at which the illumination light is applied by the irradiation optical system; and a light receiver configured to receive light generated from each cell flowing in the flow cell, upon application of the illumination light by the irradiation optical system. The illumination light includes zero-order diffracted light whose relative intensity relative to another diffracted light is not greater than 10 times. The irradiation optical system applies the illumination light to a position through which the cell in the flow cell passes.

11 Claims, 15 Drawing Sheets

(51) Int. Cl.
    *G01N 15/14*         (2024.01)
    *G01N 15/1434*    (2024.01)

(58) Field of Classification Search
    USPC .......................................................... 356/337
    See application file for complete search history.

(56)              References Cited

FOREIGN PATENT DOCUMENTS

| JP | 2021-530715 A | 11/2021 |
| WO | 2016/136801 A1 | 9/2016 |
| WO | 2019/093146 A1 | 5/2019 |

* cited by examiner

EMBODIMENT 1

AI ALGORITHM BEFORE BEING TRAINED

AI ALGORITHM AFTER BEING TRAINED

DETECTION SIGNAL OF LYMPHOCYTE, RELATIVE INTENSITY=0.93 TIMES

ENLARGED

DETECTION SIGNAL OF NEUTROPHIL, RELATIVE INTENSITY=0.93 TIMES

ZERO-ORDER DIFFRACTED LIGHT
(10 TIMES) IS ASSUMED

RELATIVE INTENSITY=10.00 TIMES

CLASSIFICATION PERFORMANCE WHEN LENGTH OF ILLUMINATION LIGHT WAS CHANGED

| LENGTH OF ILLUMINA-TION LIGHT | 100pix | 200pix | EMBODIMENT 1 | | | | | |
|---|---|---|---|---|---|---|---|---|
| | | | 300pix | 400pix | 500pix | 600pix | 700pix | 999pix |
| AVERAGE | 92.63 | 93.51 | 94.63 | 95.10 | 95.25 | 95.68 | 95.49 | 95.77 |
| 2SD | 1.099 | 1.278 | 0.614 | 0.414 | 0.692 | 0.505 | 0.530 | 0.834 |

COMPARISON EXAMPLE, RELATIVE INTENSITY=46 TIMES

EMBODIMENT 1, RELATIVE INTENSITY=10 TIMES

EMBODIMENT 1, RELATIVE INTENSITY=5 TIMES

NUMBER OF ELAPSED STEPS

EMBODIMENT 1, RELATIVE INTENSITY=1 TIMES

NUMBER OF ELAPSED STEPS

EMBODIMENT 2   100

EMBODIMENT 3

OPTICAL SYSTEM AND SPECIMEN ANALYZER

CROSS REFERENCE TO RELATED APPLICATIONS

This application claims priority from prior Japanese Patent Application No. 2022-176767, filed on Nov. 2, 2022, entitled "OPTICAL SYSTEM AND SPECIMEN ANALYZER", the entire content of which is incorporated herein by reference.

FIELD OF THE INVENTION

The present invention relates to an optical system and a specimen analyzer.

BACKGROUND OF THE INVENTION

As a technique to accurately and speedily perform classification of cells contained in a sample, a technique referred to as Ghost Cytometry (registered trademark) is described in Japanese Laid-open Patent Publication No. 2021-530715 (translation of PCT International Application) as below. In this technique, patterned structured illumination is applied to a sample containing cells and information of light generated from each cell is inputted to a machine learning classifier, whereby cell classification is performed. For example, as in an optical system shown in FIG. 15, the structured illumination is generated by using diffractive optical elements DOE-1, DOE-2, and is applied to a sample containing cells through an objective lens 1004 and a fluorescence film 1001. In order to suppress influence of noise on a cell-derived signal necessary for analysis, the structured illumination generated by the diffractive optical elements DOE-1, DOE-2 is applied to a conjugated image plane by using a lens 1002 having a focal length of 150 mm, and a diffraction pattern including zero-order and multi-order diffracted lights is blocked by a spatial filter disposed at the conjugated image plane. The structured illumination whose diffraction pattern has been blocked is relayed by a lens 1003 having a focal length of 150 mm, and is applied to a sample through the objective lens 1004 and the fluorescence film 1001.

In the configuration of Japanese Laid-open Patent Publication No. 2021-530715, in order to suppress influence of noise on a cell-derived signal necessary for analysis, a configuration for blocking the diffraction pattern is provided, which poses a problem of increase in size of the optical system. Specifically, in the configuration of Japanese Laid-open Patent Publication No. 2021-530715, in order to dispose a spatial filter which blocks the diffraction pattern, two lenses 1002, 1003 are required. The two lenses 1002, 1003 are disposed with an interval of 300 mm therebetween in consideration of the focal length, which is a factor of increase in size of the optical system.

SUMMARY OF THE INVENTION

The scope of the present invention is defined solely by the appended claims, and is not affected to any degree by the statements within this summary.

An optical system (100) of the present invention includes: a light source (111) configured to emit light; an irradiation optical system (IS) including a diffractive optical element (114) on which the light is incident, the irradiation optical system (IS) being configured to apply illumination light in which a plurality of diffracted lights generated by the diffractive optical element (114) are distributed; a flow cell (101) in which a sample containing cells is caused to flow to a position at which the illumination light is applied by the irradiation optical system (IS); and a light receiver (123, 133, 143) configured to receive light generated from each cell flowing in the flow cell (101), upon application of the illumination light by the irradiation optical system (IS). The illumination light includes zero-order diffracted light whose relative intensity relative to another diffracted light is not greater than 10 times, and the irradiation optical system (IS) applies the illumination light including the zero-order diffracted light to a position (R) through which the cell in the flow cell (101) passes.

A specimen analyzer (1) of the present invention includes: a sample preparation part (21) configured to mix a specimen containing cells and a reagent to prepare a sample; a light source (111) configured to emit light; an irradiation optical system (IS) including a diffractive optical element (114) on which the light is incident, the irradiation optical system (IS) being configured to apply illumination light in which a plurality of diffracted lights generated by the diffractive optical element (114) are distributed; a flow cell (101) in which the sample containing the cells is caused to flow to a position at which the illumination light is applied by the irradiation optical system (IS); a light receiver (123, 133, 143) configured to receive light generated from each cell flowing in the flow cell (101), upon application of the illumination light by the irradiation optical system (IS); and a controller (10) programmed to classify the cell on the basis of a signal from the light receiver (122, 133, 143). The illumination light includes zero-order diffracted light whose relative intensity relative to a plurality of other diffracted lights is not greater than 10 times, and the irradiation optical system (IS) applies the illumination light including the zero-order diffracted light to a position (R) through which the cell in the flow cell (101) passes.

DETAILED DESCRIPTION

Embodiment 1

Figure 1:
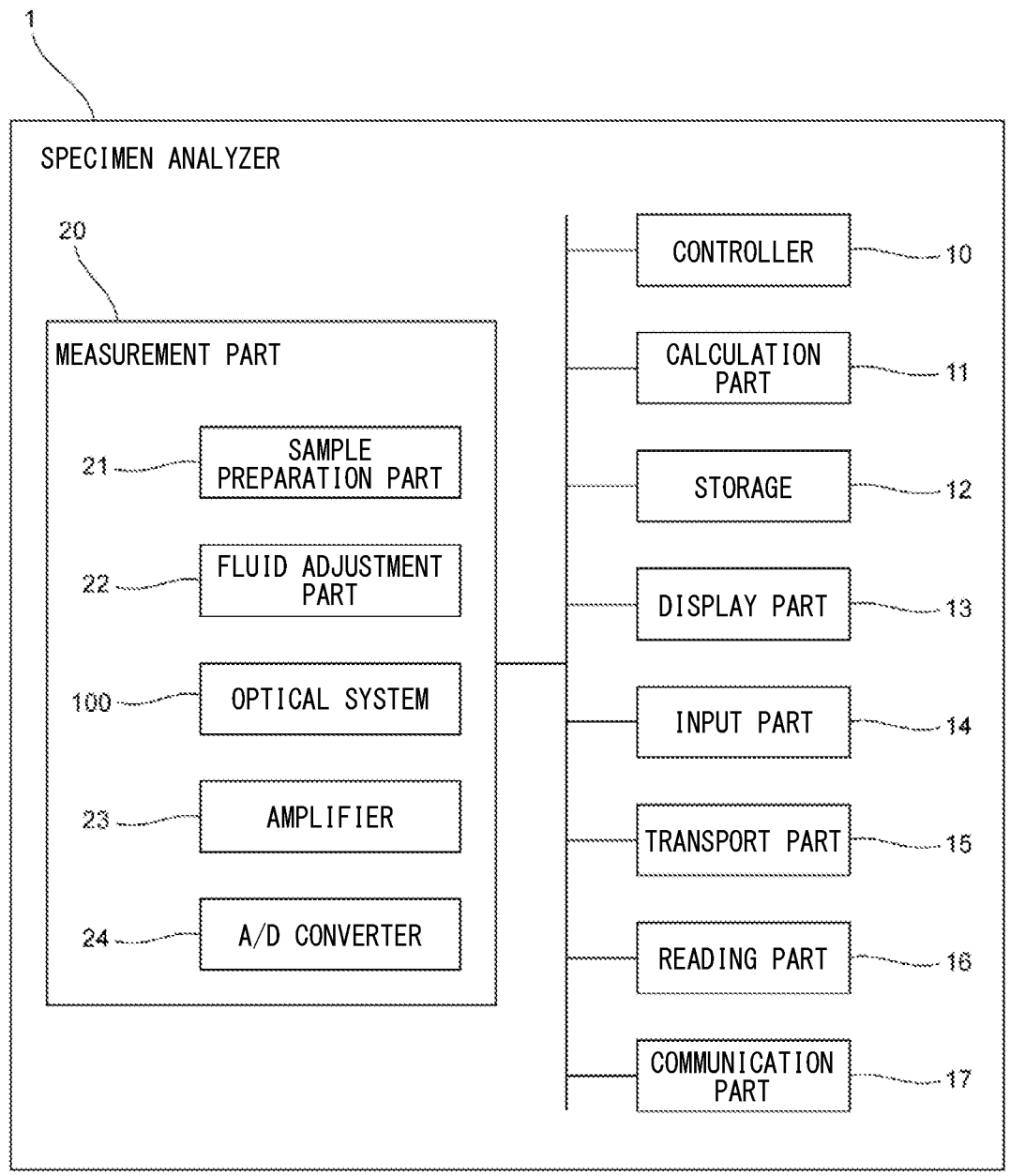
FIG. 1 is a block diagram showing a configuration of a specimen analyzer according to Embodiment 1.

FIG. 1 is a block diagram showing a configuration of a specimen analyzer 1.

The specimen analyzer 1 includes a controller 10, a calculation part 11, a storage 12, a display part 13, an input part 14, a transport part 15, a reading part 16, a communication part 17, and a measurement part 20.

The controller 10 is implemented by a CPU. The calculation part 11 is implemented by a GPU. The storage 12 is implemented by a ROM, a RAM, an SSD, an HDD, and the like. The controller 10 receives a signal outputted by each component of the specimen analyzer 1, and controls each component of the specimen analyzer 1.

The controller 10 executes a program stored in the storage 12 for cell analysis, and on the basis of a detection signal obtained in the measurement part 20, causes the calculation part 11 to perform cell analysis by an AI algorithm. The AI algorithm in this case is a deep learning algorithm. More specifically, the calculation part 11 executes an AI algorithm 32 (see FIG. 2) configured as a learned neural network, and acquires a classification result of a cell on the basis of a detection signal obtained in the measurement part 20.

Before performing analysis by the AI algorithm 32 configured as a learned neural network, the calculation part 11 may execute an AI algorithm 31 (see FIG. 2) configured as a neural network before being trained, to perform learning using training data, and generate the AI algorithm 32 (see FIG. 2) configured as a learned neural network.

In FIG. 1, the controller 10 performs control of each component of the specimen analyzer 1, and the calculation part 11 performs cell classification by the AI algorithm 32. However, a single controller 10 may perform control of each component of the specimen analyzer 1 and cell classification by the AI algorithm 32.

The display part 13 is implemented by a liquid crystal display. The input part 14 is implemented by a pointing device including a keyboard, a mouse, and a touch panel. The liquid crystal display of the display part 13 and the touch panel of the input part 14 may be integrally configured. The reading part 16 is implemented by a bar code reader. The reading part 16 reads a bar code from a label attached to a specimen container, and acquires a specimen ID. The transport part 15 transports a specimen rack holding a specimen container, to a reading position for the reading part 16. The communication part 17 is a communication interface based on the Ethernet standard. The controller 10 can perform communication with another apparatus through the communication part 17.

The measurement part 20 includes a sample preparation part 21, a fluid adjustment part 22, an optical system 100, an amplifier 23, and an A/D converter 24.

The sample preparation part 21 is configured to include a pipette which suctions a specimen from a specimen container, and a chamber in which a specimen and a reagent are mixed to prepare a sample. The specimen subjected to the specimen analyzer 1 only needs to be a specimen that contains cells, and is, for example, blood, spinal fluid, bone marrow aspirate, celomic fluid, or the like. The reagent to be mixed with the specimen includes a hemolytic agent for hemolyzing red blood cells, and a fluorescent dye for staining a predetermined portion of a cell. The fluid adjustment part 22 is configured to include a container for storing a sheath liquid and a syringe for suctioning a sample or the sheath liquid. The fluid adjustment part 22 supplies a sample or the sheath liquid to the optical system 100 and adjusts the flow of the sample in the optical system 100. The optical system 100 measures the sample supplied by the fluid adjustment part 22, and outputs an analog signal reflecting the feature of each cell. The amplifier 23 amplifies the analog signal outputted from the optical system 100. The A/D converter 24 converts the analog signal amplified by the amplifier 23 into a detection signal which is a digital signal.

Figure 2:
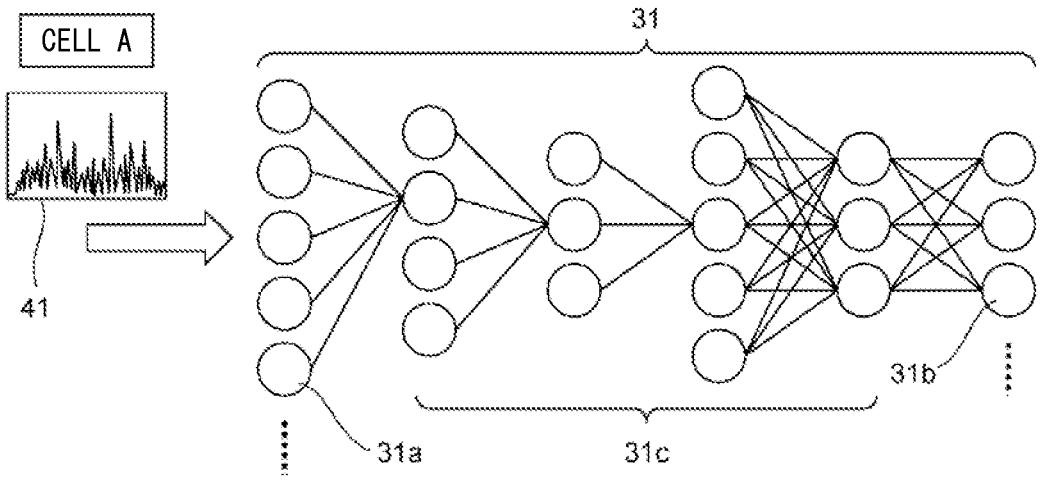
FIG. 2 is a schematic diagram showing AI algorithms before being trained and after being trained, according to Embodiment 1.
Figure 2:
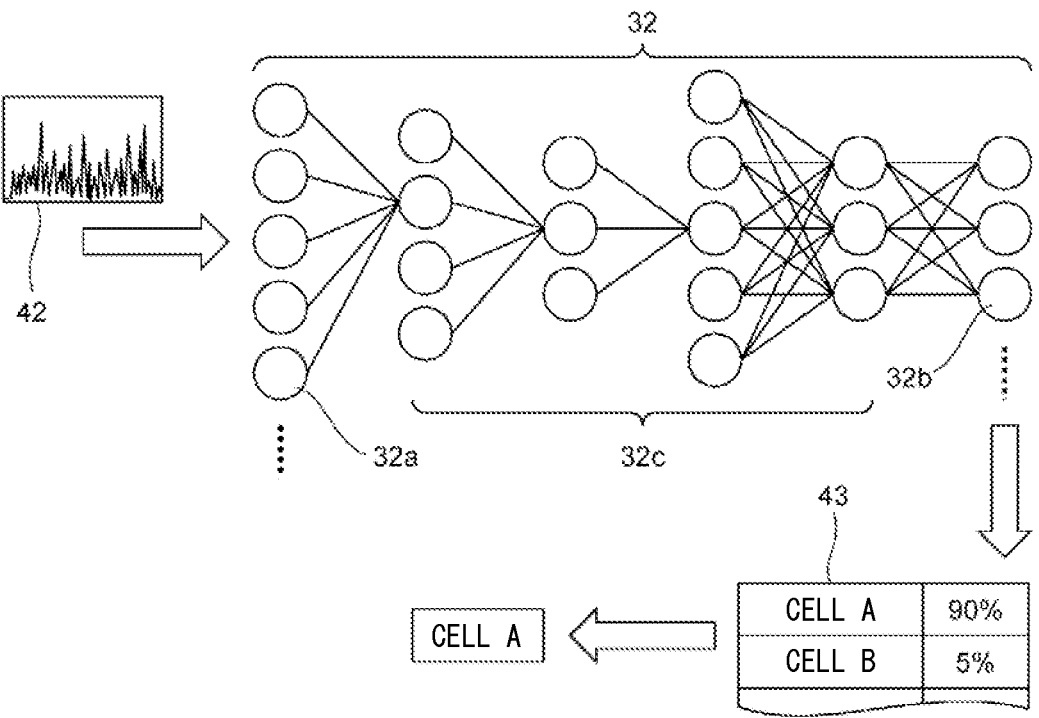

FIG. 2 is a schematic diagram showing the AI algorithm 31 before being trained and the AI algorithm 32 after being trained.

As shown in the upper part of FIG. 2, a training detection signal 41 to be used for training the AI algorithm 31 before being trained is a detection signal obtained by measuring a specific cell by the specimen analyzer 1, for example. A type ("cell A" in the example in the upper part of FIG. 2) of a cell acquired by another analyzer is associated with this detection signal.

The AI algorithm 31 is configured as a neural network including a middle layer composed of multiple layers. The neural network in this case is a convolution neural network having a convolution layer, for example. The AI algorithm 31 has an input layer 31a, an output layer 31b, and a middle layer 31c. Pieces of data of a detection signal obtained by sampling, at a predetermined sampling interval, an analog signal obtained from one cell are inputted to the input layer 31a, and a label value corresponding to the type of the cell is inputted to the output layer 31b, whereby the AI algorithm 31 is trained. Such training is repeatedly executed in advance, whereby the AI algorithm 32 after being trained is generated.

As shown in the lower part of FIG. 2, the AI algorithm 32 after being trained also has an input layer 32a, an output layer 32b, and a middle layer 32c. A detection signal 42 acquired on the basis of a specimen of a subject is inputted to the input layer 32a. Accordingly, classification information 43 regarding the type of the cell corresponding to the detection signal 42 is outputted from the output layer 32b. The classification information 43 includes a probability that the target cell corresponds to each of a plurality of types. Further, on the basis of a calculation result including these probabilities calculated by the calculation part 11, the controller 10 determines the type having the highest probability ("cell A" in the example in the lower part of FIG. 2) as the type of the target cell, and causes the display part 13 to display the determination result.

Such training of the AI algorithm 31 and classification using the AI algorithm 32 are performed such that pieces of data of a detection signal obtained for each individual cell by one or more light receivers out of three light receivers 123, 133, 143 described later (see FIG. 3) are inputted as input data to the input layer 32a. Specifically, using a detection signal obtained from one of the light receivers 123, 133, 143, when n pieces of data are obtained from a detection signal obtained with respect to each individual cell, the number of data of the detection signal inputted to the AI algorithm 31, 32 correspondingly to one cell is n, and the number of nodes of the input layer 31a, 32a is also n. For example, when pieces of data of three detection signals obtained from the respective three light receivers 123, 133, 143 (see FIG. 3) are inputted as input data to the input layer 31a, 32a, 3n pieces of data are obtained from the three detection signals, and the number of nodes of the input layer 31a, 32a is also 3n.

Figure 3:
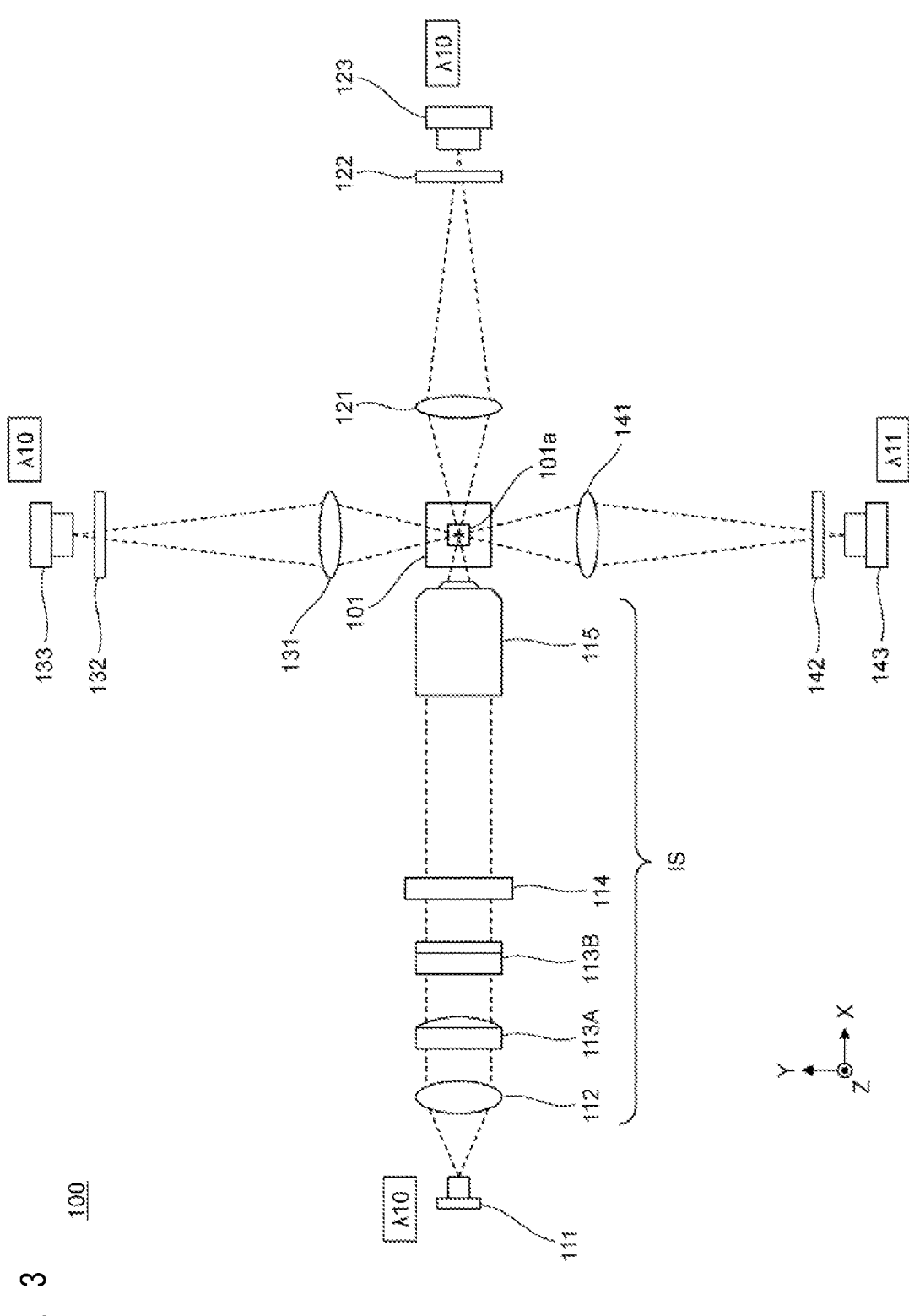
FIG. 3 schematically shows a configuration of an optical system according to Embodiment 1.

FIG. 3 schematically shows a configuration of the optical system 100. In FIG. 3, X-, Y-, Z-axes orthogonal to each other are provided for convenience. The Z-axis positive direction is the flow direction of a sample in a flow cell 101.

The optical system 100 includes the flow cell 101, a light source 111, an irradiation optical system IS, condenser lenses 121, 131, 141, optical filters 122, 132, 142, and the light receivers 123, 133, 143. The irradiation optical system IS includes a collimator lens 112, cylindrical lenses 113A, 113B, a diffractive optical element (DOE) 114, and a condenser lens 115. The irradiation optical system IS applies illumination light to the flow cell 101.

The light source 111 is a semiconductor laser light source, for example. The light source 111 emits light having a predetermined wavelength λ10 in the X-axis positive direction. The wavelength λ10 is 405 nm, for example. The fast-axis direction and the slow-axis direction of the light source 111 are parallel to the Y-axis direction and the Z-axis direction, respectively.

The collimator lens 112 has a curved surface that is curved with respect to the Y-axis and the Z-axis and reduces the angle of divergence of light emitted from the light source 111.

The cylindrical lens 113A has a lens surface that is curved only in a direction parallel to an X-Y plane. The generatrix of this lens surface is parallel to the Z-axis. The cylindrical lens 113A converges the light emitted from the light source 111 into the fast-axis direction, to adjust the divergence of the light in the fast-axis direction into a state of being substantially parallel. That is, the cylindrical lens 113A has an action of parallelizing the light emitted from the light source 111 only into the fast-axis direction.

The cylindrical lens 113B has a lens surface that is curved only in a direction parallel to an X-Z plane. The generatrix of this lens surface is parallel to the Y-axis. The cylindrical lens 113B converges the light emitted from the light source 111 into the slow-axis direction, to adjust the divergence of the light in the slow-axis direction into a state of being substantially parallel. That is, the cylindrical lens 113B has an action of parallelizing the light emitted from the light source 111 only into the slow-axis direction.

The collimator lens 112 and the cylindrical lenses 113A, 113B are disposed such that the light emitted from the light source 111 and transmitted through the collimator lens 112 and the cylindrical lenses 113A, 113B has a shape of a substantially perfect circle when viewed in the X-axis direction. Accordingly, the light incident on the diffractive optical element 114 has a shape of a substantially perfect circle.

The diffractive optical element 114 has formed therein a diffraction pattern having a complicated projected/recessed shape due to grooves, inclinations, and the like for providing the light incident thereon with a diffraction effect. The diffractive optical element 114 can be prepared on the basis of the description in Japanese Patent No. 5849954, for example. The diffractive optical element 114 diffracts, with respect to the X-axis direction, the light in the X-axis direction incident from the cylindrical lens 113B side, thereby generating a plurality of diffracted lights having advancing directions different from each other. The plurality of diffracted lights are those obtained by spectrally dividing the incident light. The diffraction orders of the plurality of diffracted lights are different from each other. The condenser lens 115 condenses the plurality of diffracted lights generated from the diffractive optical element 114, onto the flow cell 101. The plurality of diffracted lights generated by the diffractive optical element 114 and having advancing directions different from each other are condensed at the flow cell 101 to form illumination light. Out of the plurality of diffracted lights included in the illumination light, zero-order diffracted light is generated in the normal direction of the diffractive optical element 114, and other diffracted lights other than the zero-order diffracted light are generated in directions different from the normal direction of the diffractive optical element 114. The intensities of the other diffracted lights other than the zero-order diffracted light are substantially the same with each other. Meanwhile, although depending on the design of the diffractive optical element 114, the intensity of the zero-order diffracted light is not equivalent to the intensities of the other diffracted lights. Here, the intensity of light means the light amount (mW) of each diffracted light at the light condensing surface of the illumination light.

In the flow cell 101, a sample containing cells such as neutrophils, eosinophils, basophils, lymphocytes, and monocytes flows. The illumination light is applied to each cell flowing in the flow cell 101, and forward scattered light, side scattered light, and fluorescence are generated from the portions of the cell to which the respective diffracted lights in the illumination light have been applied. The forward scattered light is generated in the X-axis positive direction, and the side scattered light and the fluorescence are generated in a direction (e.g., the Y-axis direction) that crosses the X-axis direction. Here, when light having the wavelength λ10 is applied to the fluorescent dye staining the cell, fluorescence having a wavelength λ11 is generated from this fluorescent dye.

The condenser lens 121 condenses forward scattered light generated from the cell, onto the light receiver 123. The optical filter 122 is configured to allow only light having the wavelength λ10 to be transmitted therethrough. The light receiver 123 receives the forward scattered light transmitted through the optical filter 122 and outputs a detection signal according to the intensity of the received light. The light receiver 123 is a photomultiplier (PMT).

The condenser lens 131 condenses side scattered light generated from the cell, onto the light receiver 133. The optical filter 132 is configured to allow only light having the wavelength λ10 to be transmitted therethrough. The light receiver 133 receives the side scattered light transmitted through the optical filter 132, and outputs a detection signal according to the intensity of the received light. The light receiver 133 is a photomultiplier (PMT).

The condenser lens 141 condenses fluorescence generated from the cell, onto the light receiver 143. The optical filter 142 is configured to allow only light having the wavelength λ11 to be transmitted therethrough. The light receiver 143 receives the fluorescence transmitted through the optical filter 142, and outputs a detection signal according to the intensity of the received light. The light receiver 143 is a photomultiplier (PMT). Instead of the photomultiplier (PMT), a photodiode may be used as the light receiver 123, 133, 143.

Figure 4:
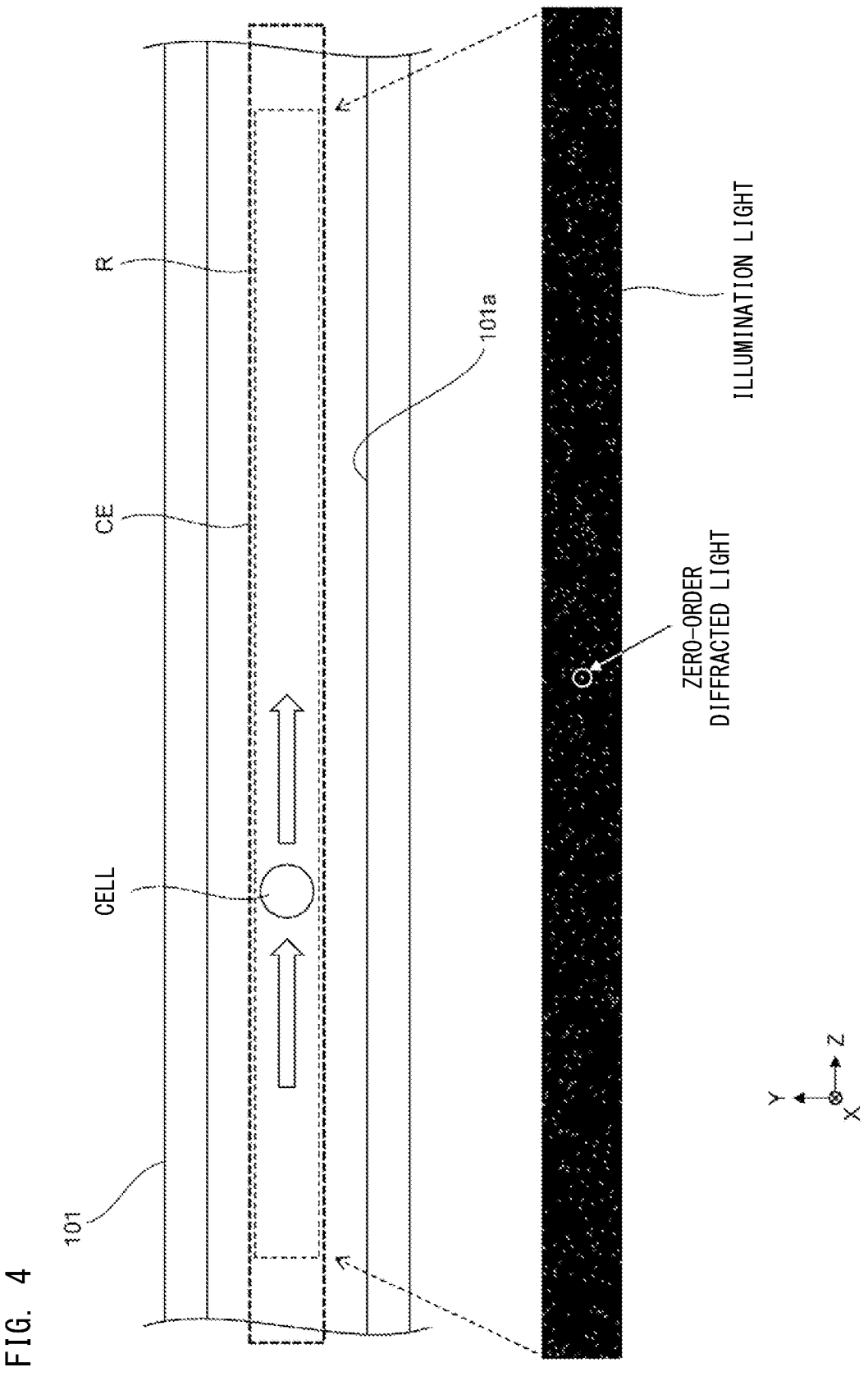
FIG. 4 schematically shows a flow cell and illumination light according to Embodiment 1.

FIG. 4 schematically shows the flow cell 101 and the illumination light. In FIG. 4, the X-, Y-, Z-axes similar to those in FIG. 3 are provided.

Inside the flow cell 101, a flow path 101a in which a sample flows is formed in parallel to the Z-axis. A sheath liquid is caused to flow together with the sample in the flow path 101a, whereby each cell included in the sample passes through a center region CE of the flow path 101a, while being wrapped by the sheath liquid. The illumination light condensed by the condenser lens 115 is applied to a predetermined irradiation range R positioned at the center region CE of the flow path 101a. The concentration of the sample, the flow rate of the sample, and the like are adjusted such that, in the irradiation range R, only one cell is positioned at one time, in other words, two or more cells do not simultaneously pass through the irradiation range R.

The lower part of FIG. 4 shows an image obtained when an image of illumination light generated by a trial product (AGC Inc.) of the diffractive optical element 114 and applied in a dark room was captured by a camera (Basler AG, acA3800).

In the image of the illumination light in FIG. 4, the black part indicates a range where no light is included, and white dots indicate a range where light is included. A white dot near the center of the image of the illumination light indicates the zero-order diffracted light generated by the diffractive optical element 114. The other white dots in the image of the illumination light indicate the other diffracted lights other than the zero-order diffracted light generated by the diffractive optical element 114. The diffracted lights in the present embodiment include the zero-order diffracted light, +1 to +300-order diffracted lights, and −1 to −300-order diffracted lights, and are shown as 601 white dots in total in the image of the illumination light. The diffraction pattern (steps and grooves), etc., are formed in the diffractive optical element 114 such that the respective diffracted lights are distributed as shown in the image of the illumination light in FIG. 4.

Figure 5:
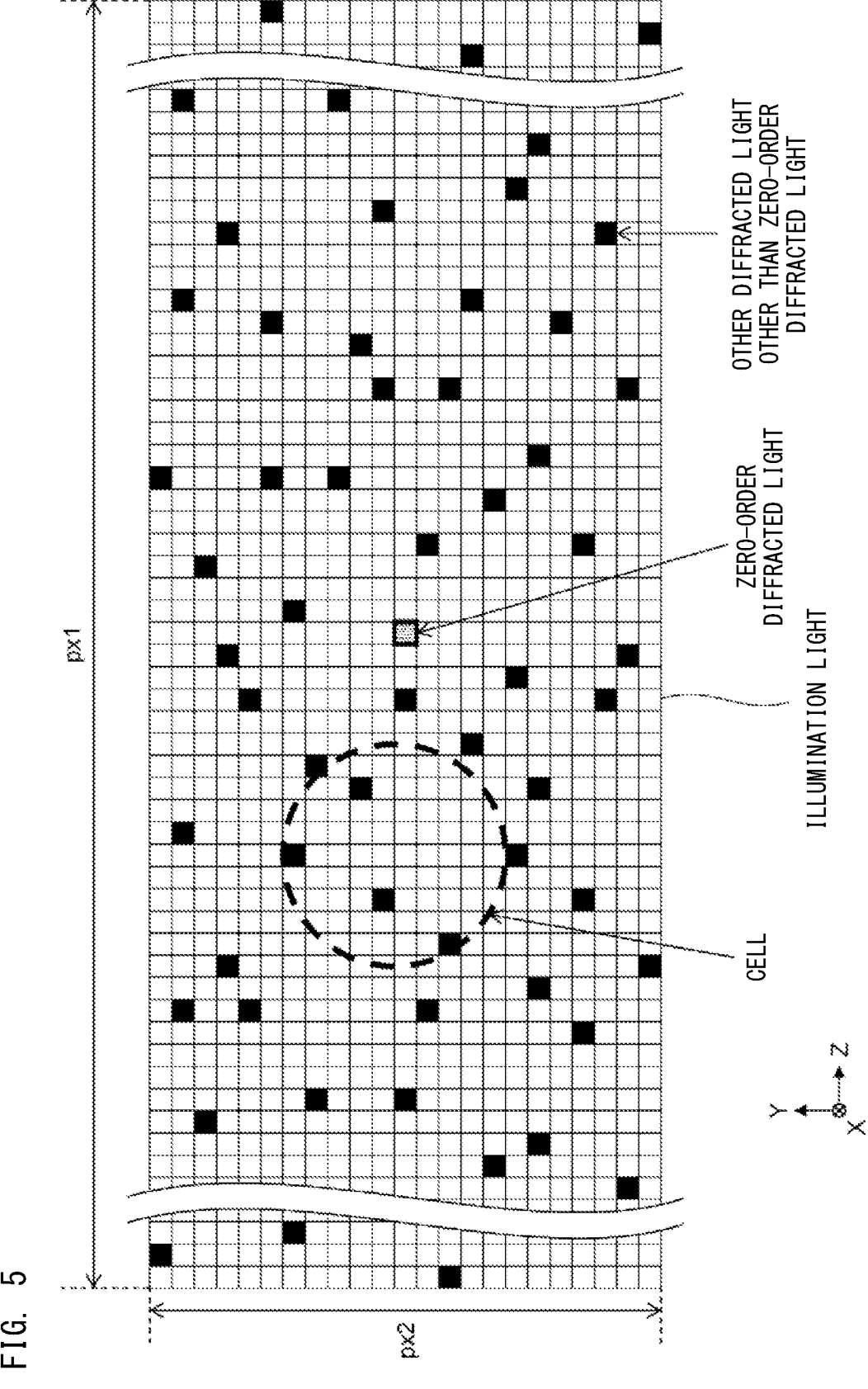
FIG. 5 schematically shows a distribution pattern of diffracted lights included in the illumination light, according to Embodiment 1.

FIG. 5 schematically shows a distribution pattern of the diffracted lights included in the illumination light.

FIG. 5 shows an image in which the irradiation range R is sectioned into a grid shape by a plurality of squares whose sides have the same length as the diameter of the spot of the zero-order diffracted light. The center square shown with hatching indicates the region where the spot of the zero-order diffracted light is included, and each black square indicates a region where the spot of one of the other diffracted lights other than the zero-order diffracted light is included. Each white square indicates a region where no spot of diffracted light is included. In FIG. 5, a cell passing through the irradiation range R is indicated by a broken line circle. The diameter of the spot of each diffracted light included in the image of the illumination light in FIG. 4 is about 1 μm. Therefore, in this case, the size of each square is 1×1 μm. The size of the cell is about 10 μm.

The size and the length in the Y-axis direction or the Z-axis direction of the illumination light in the irradiation range R (see FIG. 4) can be expressed in terms of the number of pixels when each region in the grid shape is defined as one pixel. In the example shown in FIG. 5, the length of the illumination light in the flow direction (the Z-axis direction) of the sample in the flow cell 101 is px1 (pixels), the length in the short direction (the Y-axis direction) of the illumination light is px2 (pixels), and the size of the illumination light is px1×px2 (pixels).

The diffractive optical element 114 is designed such that a plurality of diffracted lights forming the illumination light are distributed in a predetermined pattern. Here, the predetermined pattern is a random pattern. The pattern may be a pattern in which there is no repetition of a specific pattern at all, or may be a pattern in which a specific pattern is repeated cyclically. However, in order to cause the entire portion of the cell to be exposed to the illumination light at least once, at least one of the other diffracted lights is disposed in a region whose length in the Y-axis direction is one pixel and which extends in the Z-axis direction.

During measurement, when a sample is caused to flow in the flow path 101a of the flow cell 101, each cell in the sample moves in the Z-axis positive direction in the irradiation range R of the illumination light. At this time, the flow rate is adjusted so as to be substantially constant by the fluid adjustment part 22. When diffracted light included in the illumination light is applied to a cell flowing in the Z-axis positive direction, forward scattered light and side scattered light are generated from the portion of the cell to which the diffracted light has been applied. When diffracted light is applied to the cell stained by the fluorescent dye, fluorescence is generated from the fluorescent dye to which the diffracted light has been applied. The light receiver 123 receives forward scattered light generated due to one or a plurality of diffracted lights applied to the cell, the light receiver 133 receives side scattered light generated due to one or a plurality of diffracted lights applied to the position of the cell, and the light receiver 143 receives fluorescence generated due to one or a plurality of diffracted lights applied to the position of a predetermined portion of the stained cell.

In accordance with the flowing of the cell in the Z-axis positive direction, the number of diffracted lights applied to the cell changes, and the portion of the cell to which each diffracted light is applied changes, whereby the intensities of the forward scattered light, the side scattered light, and the fluorescence generated from the cell change over time. Therefore, the detection signal of each light receiver 123, 133, 143 also changes in time series. The calculation part 11 classifies the cell by the AI algorithm 32 on the basis of these detection signals.

Figure 15:
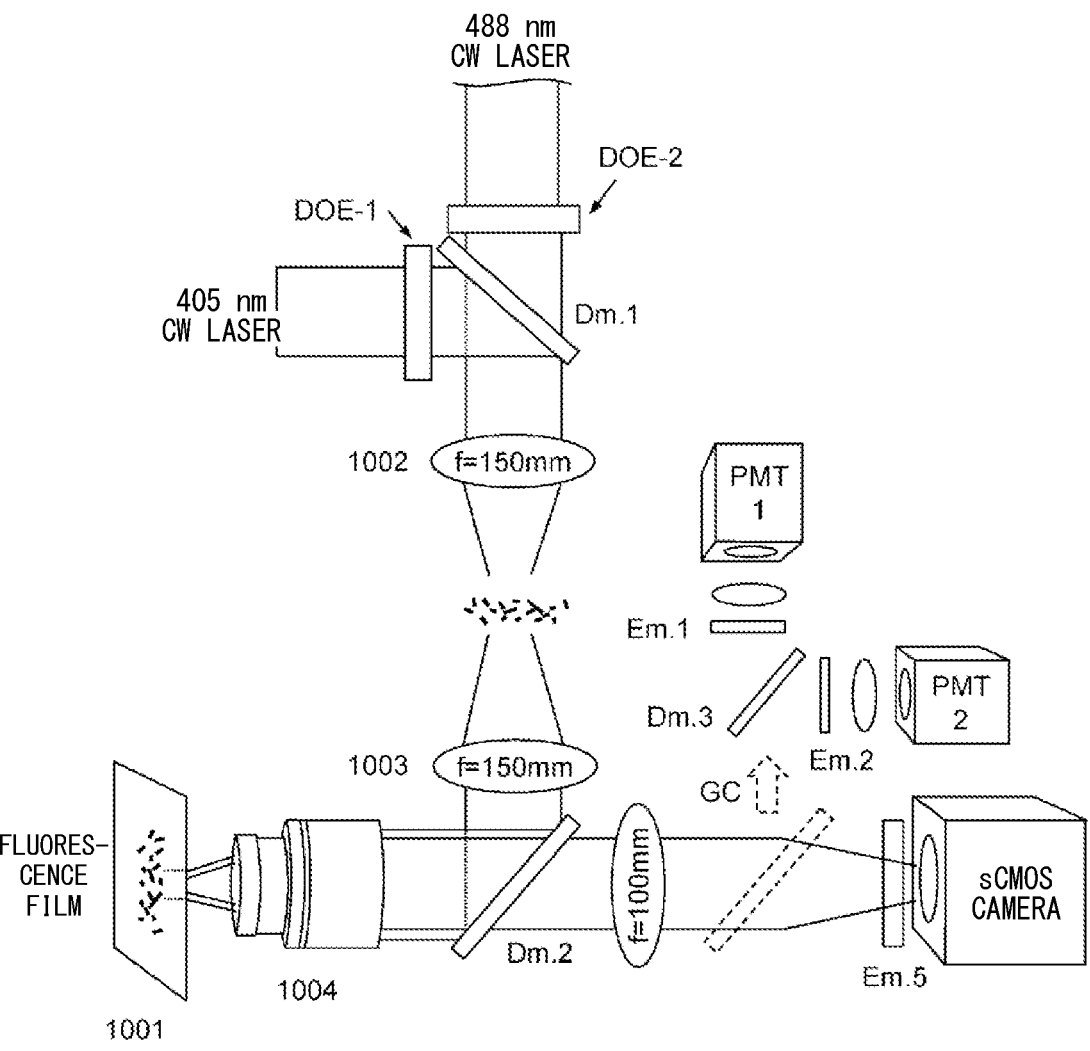
FIG. 15 schematically shows an optical system according to conventional art.

In the conventional apparatus shown as an example in Japanese Laid-open Patent Publication No. 2021-530715, as described with reference to FIG. 15, the diffraction pattern including zero-order and multi-order diffracted lights generated from the diffractive optical element is blocked by the lenses 1002, 1003 and the spatial filter. This configuration poses a restriction for downsizing of the optical system. In contrast to this, as a result of the studies by the present inventors, it was found that, when the illumination light including the zero-order diffracted light whose relative intensity relative to the other diffracted lights is not greater than 10 times is applied to a cell, downsizing of the apparatus can be realized while cell classification by the AI algorithm is enabled.

Here, the relative intensity of the zero-order diffracted light relative to at least one of the other diffracted lights other than the zero-order diffracted light is defined as RI, and a method for calculating the relative intensity RI is described.

In the following, the intensity of incident light incident on the diffractive optical element 114 is defined as L0. The intensity of the zero-order diffracted light is defined as L1. The intensity of the other diffracted light other than the zero-order diffracted light is defined as L2. The light intensity L0, L1, L2 can be obtained through: measurement using an optical power meter; or capturing an image of the illumination light using a beam profiler or a camera and accumulating brightness values of a plurality of pixels corresponding to lights whose images have been captured. As for the intensity L2, when the intensities of a plurality of the other diffracted lights are substantially identical, e.g., when the variation is not greater than 3%, the intensity of one of the other diffracted lights can be used as the intensity L2. Alternatively, when the intensities of the plurality of the other diffracted lights are not substantially identical, a representative value such as an average value, a median, a mode, or a maximum value of some of the plurality of the other diffracted lights may be used.

The ratio of the intensity L1 of the zero-order diffracted light generated from the diffractive optical element 114 relative to the intensity L0 of the incident light is defined as R1. The diffraction efficiency of the diffractive optical element 114 is defined as R2. The number of the other diffracted lights included in the illumination light is defined as N. The ratios R1, R2 are characteristic values of the diffractive optical element. N is the number of dots (also referred to as "spots") in the illumination light formed by the other diffracted lights other than the zero-order diffracted light. The intensity L1 of the zero-order diffracted light is represented by formula (11) below and the intensity L2 of the other diffracted light is represented by formula (12) below.

$$L1 = L0 \times R1 \tag{11}$$

$$L2 = (L0 - L1) \times R2/N \tag{12}$$

The relative intensity RI is expressed by formula (13) below.

$$RI = L1/L2 = N \times R1/(R2 - R1 \times R2) \tag{13}$$

From this formula (13), the relative intensity RI can be obtained from measurement values obtained by actually measuring the intensities L1, L2 of lights, and can also be obtained from the characteristic values R1, R2 of the diffractive optical element 114 and the number N of spots.

One spot in the illumination light is defined as one pixel, the area of the entire region where spots can be formed is defined as S (the unit is the number of pixels), and the ratio of the area, relative to the area of the entire region, where dots (spots) in the illumination light formed by the other diffracted lights are formed is defined as a spot ratio RS (the unit is % (the number/the number of pixels)). In other words, the spot ratio RS is the ratio of the number of regions in which the other diffracted lights are included, relative to the number of the plurality of regions (see FIG. 5), in the illumination light, having a grid shape including regions in each of which one diffracted light is included and regions in each of which no diffracted light is included. In this case, the spot number N is represented by formula (14) below.

$$N = S \times RS/100 \tag{14}$$

According to formulae (11) to (14) above, the following can be said.

When the ratio R1 of the zero-order diffracted light relative to the incident light is reduced, the relative intensity RI can be reduced. Preferably, the ratio R1 is less than 3%, for example.

When the diffraction efficiency R2 of the diffractive optical element 114 is increased, the relative intensity RI can be reduced. Preferably, the diffraction efficiency R2 is not less than 60%, for example.

When the number N of spots included in the illumination light is reduced, the relative intensity RI can be reduced. In other words, when the area S in the illumination light is reduced or the spot ratio RS is reduced to decrease the spot number N, the relative intensity RI can be reduced. The lengths in the Y-axis direction and the Z-axis direction forming the area S is set to 59 pixels and 999 pixels, respectively, for example. A preferable range of the length in the Z-axis direction forming the area S will be described later with reference to FIG. 8. Preferably, the spot ratio RS is set to not less than 0.3% and not greater than 2%, for example. A preferable range of the spot ratio RS will be described later with reference to FIG. 11.

However, as long as the relative intensity RI of not greater than 10 times can be realized, the preferable range is not limited to the above.

In the following, with reference to FIGS. 6 to 10, a fact that the influence of the zero-order diffracted light can be effectively suppressed when the relative intensity RI is not greater than 10 times, is described.

First, the relative intensity RI that is allowable as the optical system while the cell classification performance by the AI algorithm is maintained was studied by using an apparatus (hereinafter, referred to as Example) made as a trial apparatus by the inventors. As the diffractive optical element 114 according to Example, the trial product used when capturing the image of the illumination light shown in the lower part of FIG. 4 above was used. Specifications of the irradiation optical system IS including this trial product of the diffractive optical element 114 were as follows.

TABLE 1

| Diffractive optical element | | | |
|---|---|---|---|
| | Incident beam | Illumination light | |
| Size | diameter | Size | Spot diameter |
| 20 × 20 × 1.5 mm | φ9 mm | 59 × 999 μm (59 × 999 pixels) | 1 μm |

The trial product of the diffractive optical element 114 was configured as a transmission type that allows incident light to be transmitted therethrough to be emitted. The ratio R1 of the intensity of the zero-order diffracted light relative to the incident light was 0.1%. The diffraction efficiency R2 of the diffractive optical element 114 was 0.7. The size of the illumination light was 999 pixels in the direction of the flow of the sample and 59 pixels in the direction orthogonal to the flow of the sample. The spot ratio RS of the other diffracted light was 1.09%. The relative intensity RI of the zero-order diffracted light relative to the other diffracted light was 0.93 times.

Figure 6:
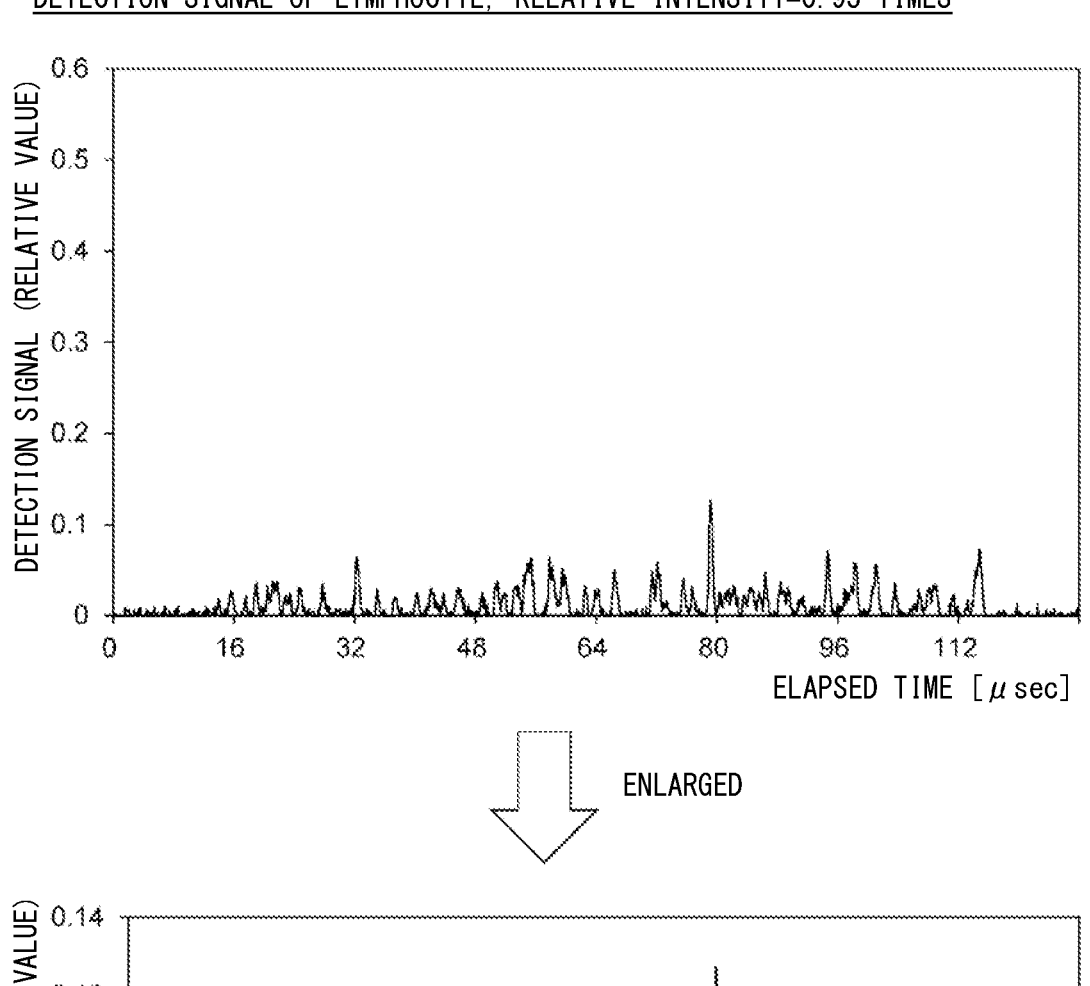
FIG. 6 shows a detection signal acquired on the basis of a lymphocyte in an experiment, according to Embodiment 1.
Figure 6:
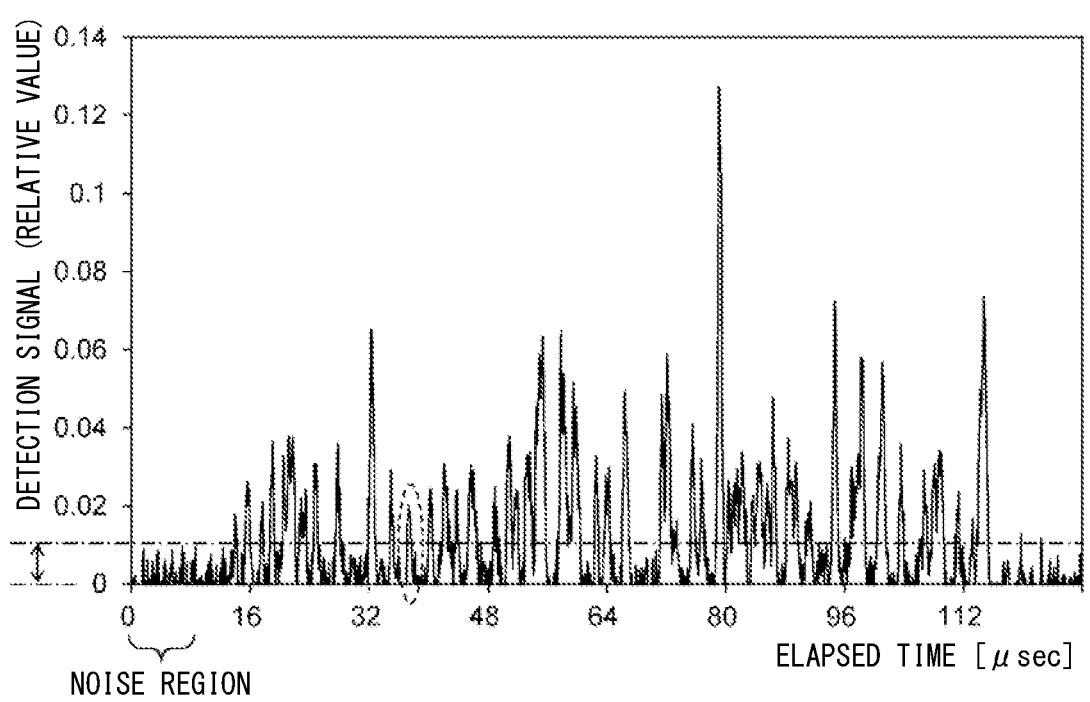
Figure 7:
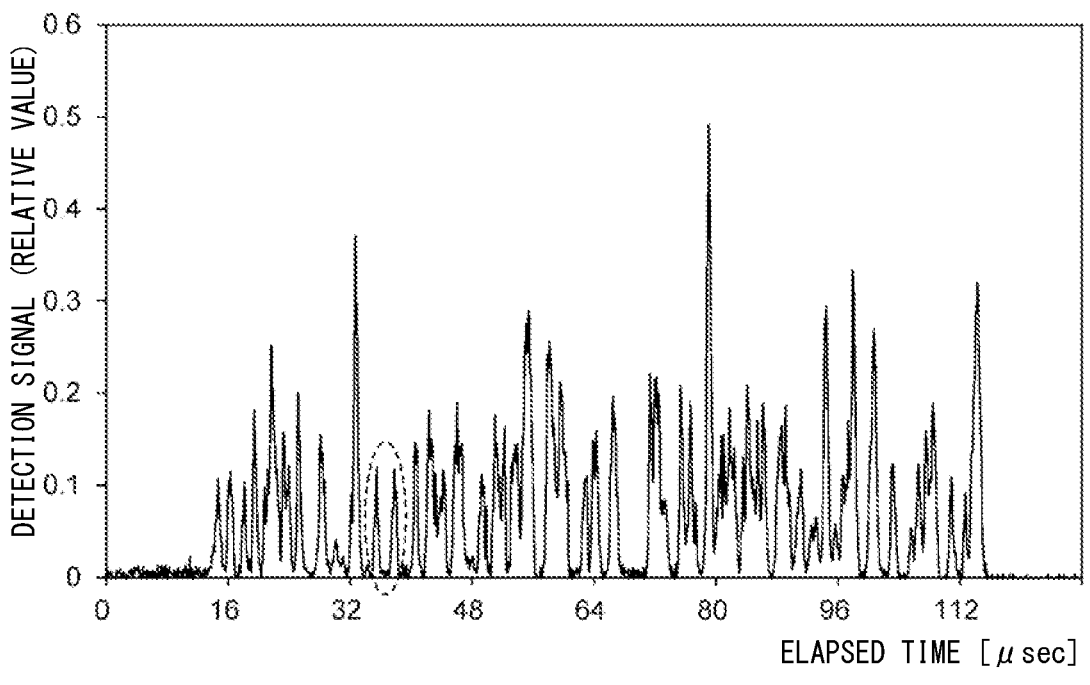
FIG. 7 shows a detection signal acquired on the basis of a neutrophil in an experiment, according to Embodiment 1.
Figure 7:
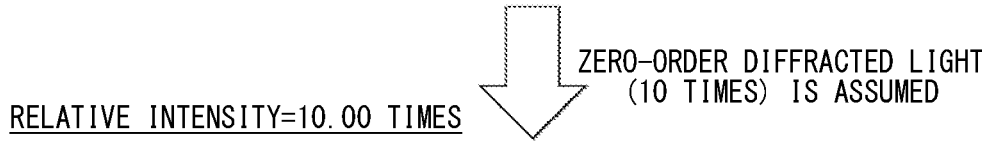
Figure 7:
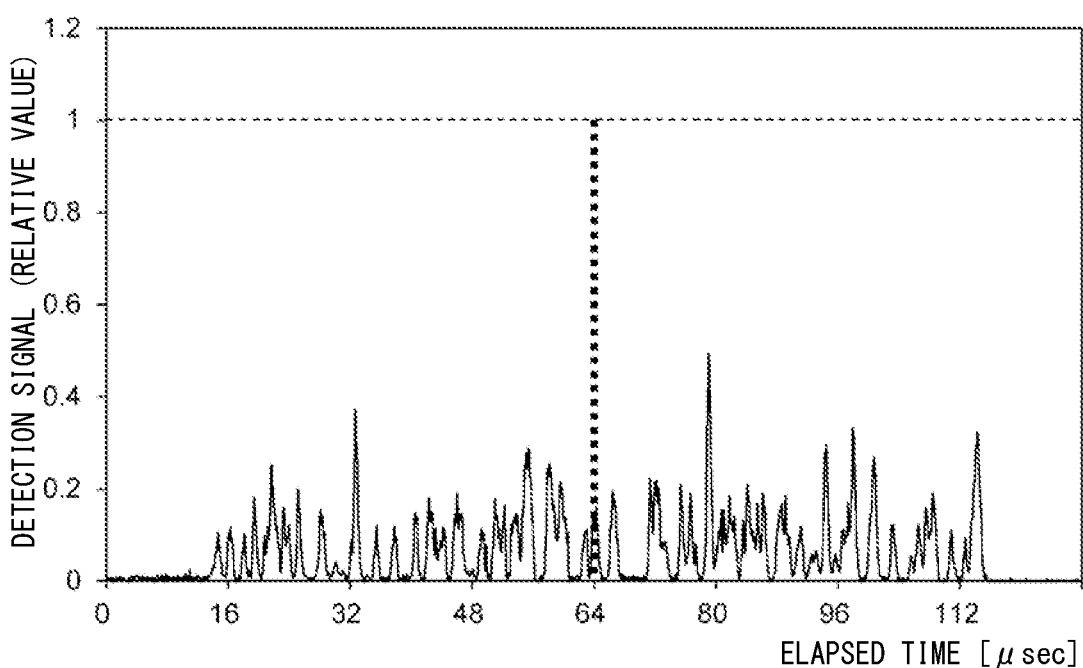

FIGS. 6, 7 are each a graph showing a detection signal acquired in an experiment performed in order to study appropriate intensity of the illumination light.

When classification of white blood cells is performed, detection signals are obtained from lights from cells such as a neutrophil, an eosinophil, a basophil, a lymphocyte, and a monocyte. The intensity of a detection signal based on a lymphocyte is the smallest, and the intensity of a detection signal based on a neutrophil is the largest. Therefore, it is necessary: to set the intensity of the illumination light including the zero-order diffracted light to be large to a certain extent so as to be able to acquire the detection signal of the lymphocyte distinguishedly from noise; and not to increase the intensity of the illumination light to a certain extent or more so as to prevent the light receiver from being saturated by the light based on the neutrophil. The following is an experiment performed by the inventors of measuring white blood cells using the apparatus of Example. In this experiment, using a control blood (manufactured by STRECK, CD-Chex Plus, product number: 213367) containing lymphocytes and neutrophils as a specimen, with respect to a plurality of types of cells contained in this specimen, a detection signal based on side scattered light generated from each cell due to application of the illumination light was acquired by the light receiver 133. In addition, fluorescence labeling for identifying the cell type of lymphocyte and neutrophil was performed on the specimen, and the detection signal based on the fluorescence was acquired by the light receiver 143.

In the graphs shown in FIG. 6, the value of the detection signal when the light receiver 133 is saturated is defined as 1.0, the vertical axis represents the relative value of the detection signal, and the horizontal axis represents the measurement time [μsec]. The graph in the upper part of FIG. 6 shows a detection signal obtained when a lymphocyte was actually measured. The graph in the lower part of FIG. 6 is an enlarged version of the graph in the upper part of FIG. 6. In the graph in the lower part of FIG. 6, the range between two alternate long and short dash lines is the range where noise superimposed on the detection signal is substantially included. The upper limit value, i.e., the threshold for noise, of the noise range is set to, for example, a value obtained by adding a value (0.00856) of 2SD of noise to the base line (0) in a noise region near the left end of the graph. In the graph in the lower part of FIG. 6, the portion surrounded by a broken line is the smallest detection signal in the detection signal excluding noise. Therefore, the portion surrounded by the broken line can be regarded as the detection signal based on one of the other diffracted lights other than the zero-order diffracted light included in the illumination light. The value of this detection signal is about 0.02.

When the sensitivity of the light receiver 133 or the intensity of the illumination light is reduced, the detection signal of the lymphocyte becomes less than the threshold for noise, and the detection signal of the lymphocyte and the detection signal of noise cannot be distinguished from each other. Thus, in FIG. 6, the sensitivity of the light receiver 133 and the intensity of the illumination light are set to a level that allows acquisition of the detection signal of the lymphocyte distinguishedly from noise. Specifically, the sensitivity of the light receiver 133 and the intensity of the illumination light are set such that the detection signal based on one of the other diffracted lights surrounded by the broken line slightly exceeds the threshold for noise.

The graph in the upper part of FIG. 7 shows a detection signal obtained when a neutrophil was actually measured. The detection signal in this case was acquired at a sensitivity of the light receiver 133 and an intensity of the illumination light similar to those at the detection of the lymphocyte in FIG. 6. In the graph in the upper part of FIG. 7, the portion surrounded by a broken line is the smallest detection signal in the detection signal excluding noise. Therefore, the portion surrounded by the broken line can be regarded as the detection signal of the neutrophil based on one of the other diffracted lights included in the illumination light. The value of this detection signal is about 0.1.

Here, as described above, the relative intensity RI of the zero-order diffracted light at the diffractive optical element 114 according to Example used in this experiment is 0.93 times. Therefore, the value of the detection signal based on the zero-order diffracted light included in the illumination light is at a level similar to the value of the detection signal based on one of the other diffracted lights. The value of the detection signal when the light receiver 133 is saturated in this case is 1.0. Therefore, if the value of the detection signal based on the zero-order diffracted light is in a range of 0.1 to 1.0, saturation of the light receiver 133 can be prevented. That is, when zero-order diffracted light in which the relative intensity RI of the zero-order diffracted light is 10 times that in the graph in the upper part of FIG. 7 is assumed, the detection signal based on the zero-order diffracted light extends to around 1.0 as indicated by a dotted line in the graph in the lower part of FIG. 7. However, the detection signal based on the zero-order diffracted light at this time is not greater than the value (1.0) when the light receiver 133 is saturated, and thus, saturation of the light receiver 133 is avoided.

As described above, according to the experiment shown in FIGS. 6, 7, in classification of white blood cells, when the relative intensity RI is set to not greater than 10 times, the detection signal can be distinguished from noise and saturation of the light receiver 133 can be avoided in each of a case of a lymphocyte having the smallest detection signal and a case of a neutrophil having the largest detection signal.

In this experiment, the detection signal from the light receiver 133 based on side scattered light was studied, but the same also applies to the detection signals based on forward scattered light and fluorescence. That is, with respect to both of the detection signal from the light receiver 123 receiving forward scattered light and the detection signal from the light receiver 143 receiving fluorescence, when the relative intensity RI is set to not greater than 10 times, the detection signal and noise can be distinguished from each other, and saturation of the light receivers 123, 143 can be avoided for each of a lymphocyte and a neutrophil.

Figure 8:
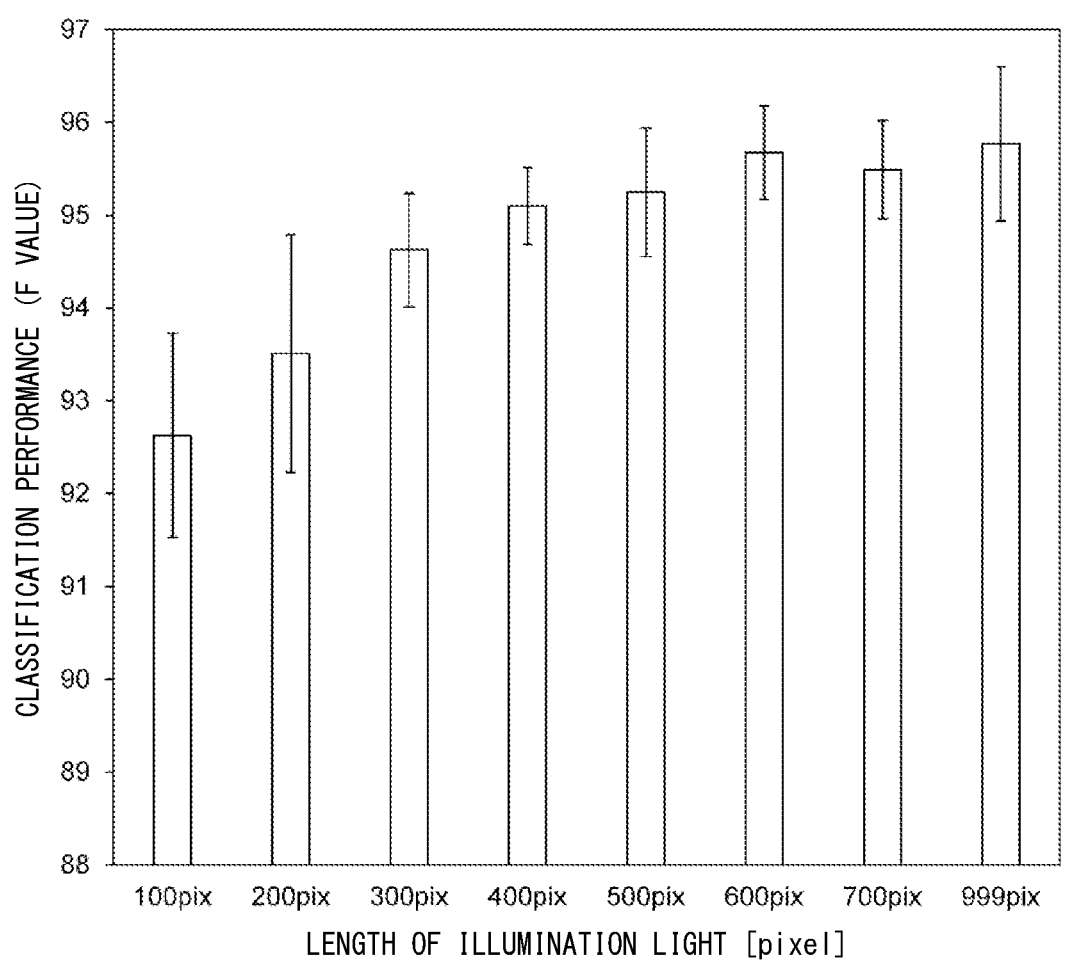
FIG. 8 shows an experiment result regarding classification performance when the length of the illumination light was changed, according to Embodiment 1.

Next, with reference to FIG. 8, an experiment result regarding the classification performance of the AI algorithm when the length in the Z-axis direction of the illumination light was changed is described.

In this experiment, the apparatus according to Example was used. The spot ratio RS of the other diffracted lights from the diffractive optical element 114 of the trial product was 1.09%. The relative intensity RI of the zero-order diffracted light from the diffractive optical element 114 was 0.93 times. A sample containing neutrophils, eosinophils, basophils, lymphocytes, and monocytes was caused to flow in the flow cell 101, the illumination light whose length in the Z-axis direction was 999 pixels was applied to the flow cell 101, and each cell was classified by the AI algorithm 32 using the detection signal from the light receiver 133 based on side scattered light. For each cell, whether the classification result was correct or incorrect was determined to acquire an F value, and the average of the F values of the cells was acquired as the classification performance. From the entirety of the detection signal corresponding to the illumination light whose length in the Z-axis direction was 999 pixels, detection signals corresponding to illumination lights whose lengths in the Z-axis direction was 100, 200, 300, 400, 500, 600, and 700 pixels were extracted, and for each extracted detection signal, the F value above was acquired, and the average of the F values was acquired.

FIG. 8 is a graph showing the classification performance when the length of the illumination light was changed. In the graph in FIG. 8, the vertical axis represents the classification performance, and the horizontal axis represents the length (the length of the illumination light corresponding to the extracted detection signal) in the Z-axis direction of the illumination light. The table in the lower part of FIG. 8 shows details of the graph in the upper part of FIG. 8.

As shown in the graph in FIG. 8, according to the optical system used in this Example, when the relative intensity RI was set to not greater than 1 times, a correct answer ratio, as the cell classification performance by the AI algorithm, of not less than 95% was able to be attained in all examples in which the length in the Z-axis direction was not less than 100 pixels. In accordance with increase in the length in the Z-axis direction of the illumination light, the classification performance increased. A reason for this is considered as follows: in accordance with increase in the length in the Z-axis direction of the illumination light, the information amount of the detection signal that can be acquired increases, and thus, a cell can be more accurately classified. As compared with the classification performance when the length in the Z-axis direction of the illumination light is 100 or 200 pixels, the classification performance when the length exceeds 300 pixels is much higher and change in the classification performance is smaller. Therefore, more preferably, the length in the Z-axis direction of the illumination light is set to not less than 300 pixels.

In this experiment, the length of the illumination light when the detection signal from the light receiver 133 based on side scattered light was used was studied. However, the same also applies to cases where detection signals based on forward scattered light and fluorescence are used. That is, it is assumed that, also in a case where the detection signal from the light receiver 123 receiving forward scattered light is used and a case where the detection signal from the light receiver 143 receiving fluorescence is used, it is preferable to set the length in the Z-axis direction of the illumination light to not less than 300 pixels.

Figure 9:
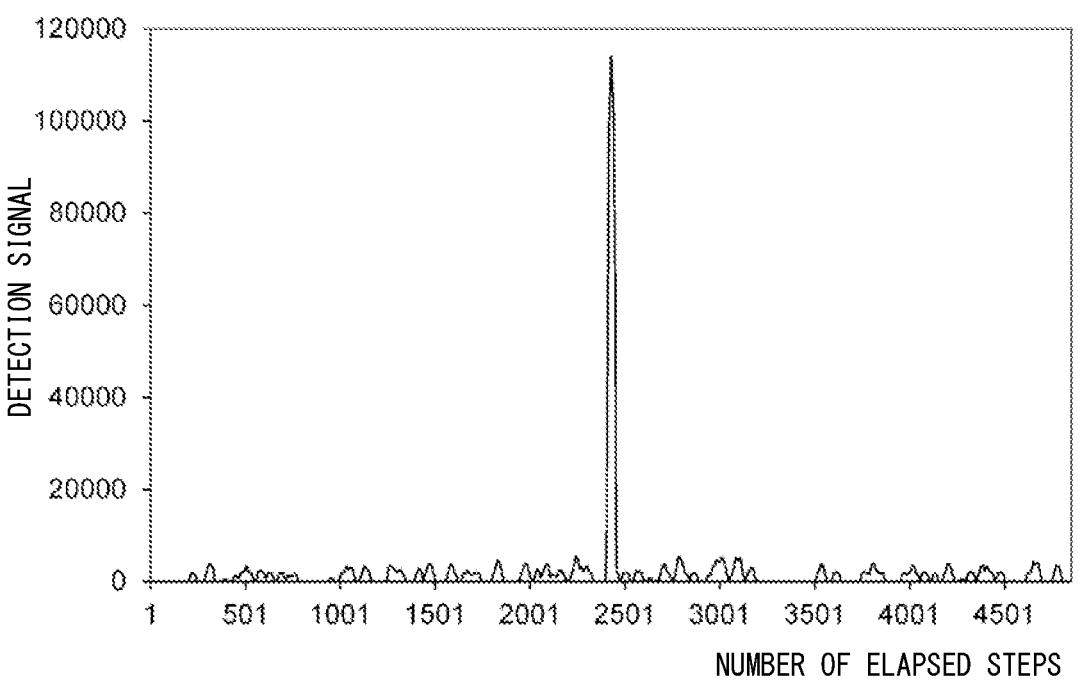
FIG. 9 shows a result of simulation regarding detection signals corresponding to relative intensities, according to Comparison Example and Embodiment 1.
Figure 9:
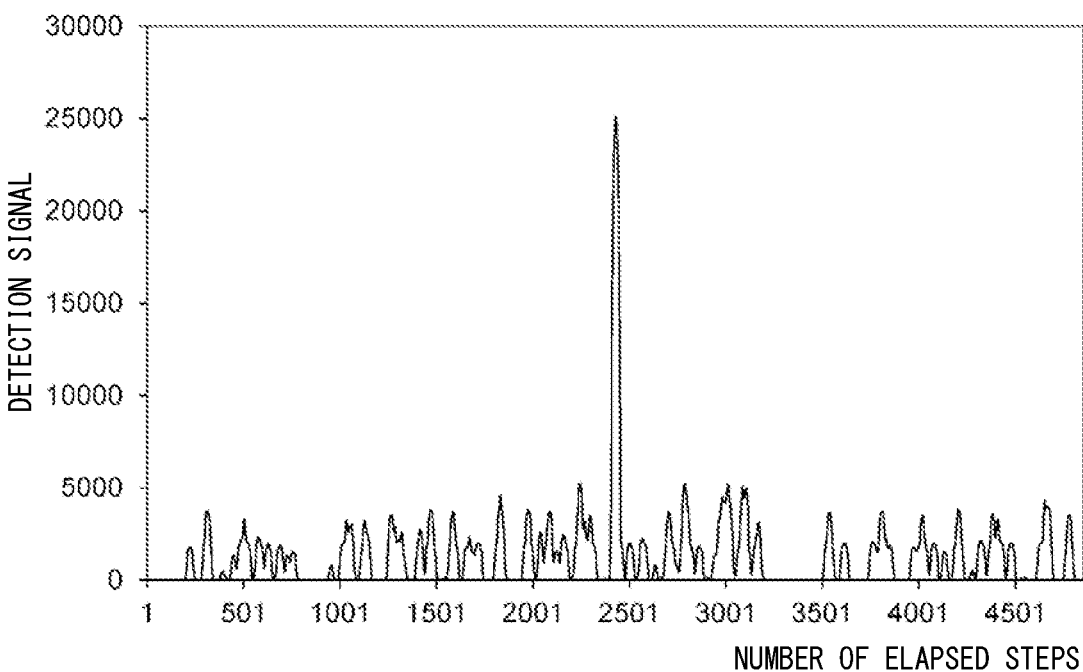
Figure 10:
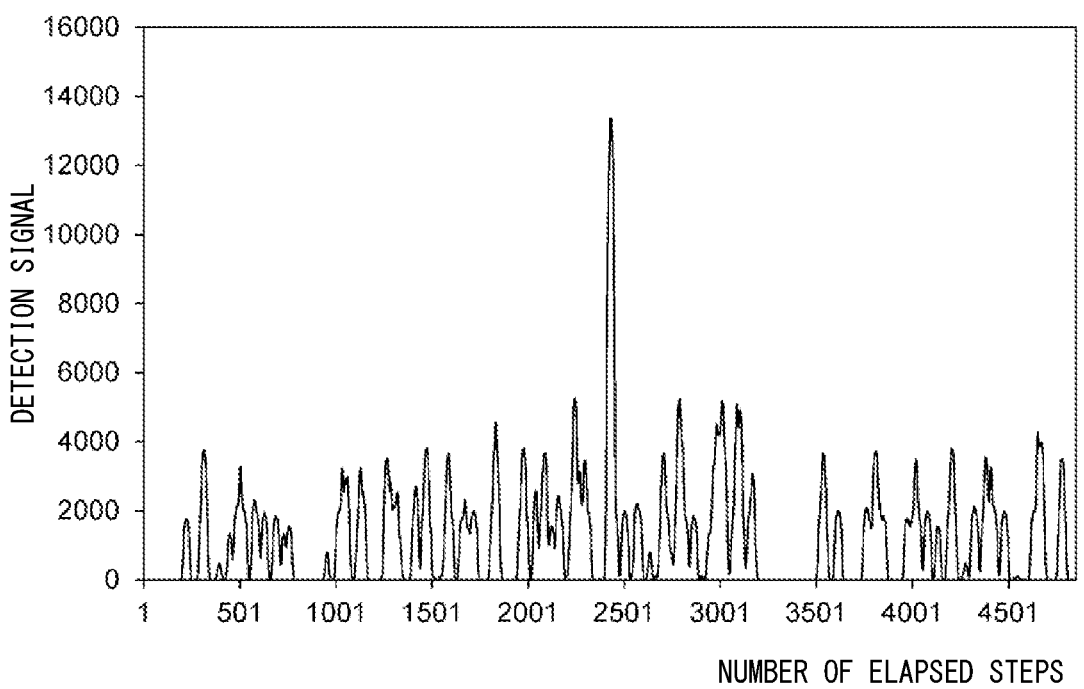
FIG. 10 shows a result of simulation regarding detection signals corresponding to relative intensities, according to Embodiment 1.
Figure 10:
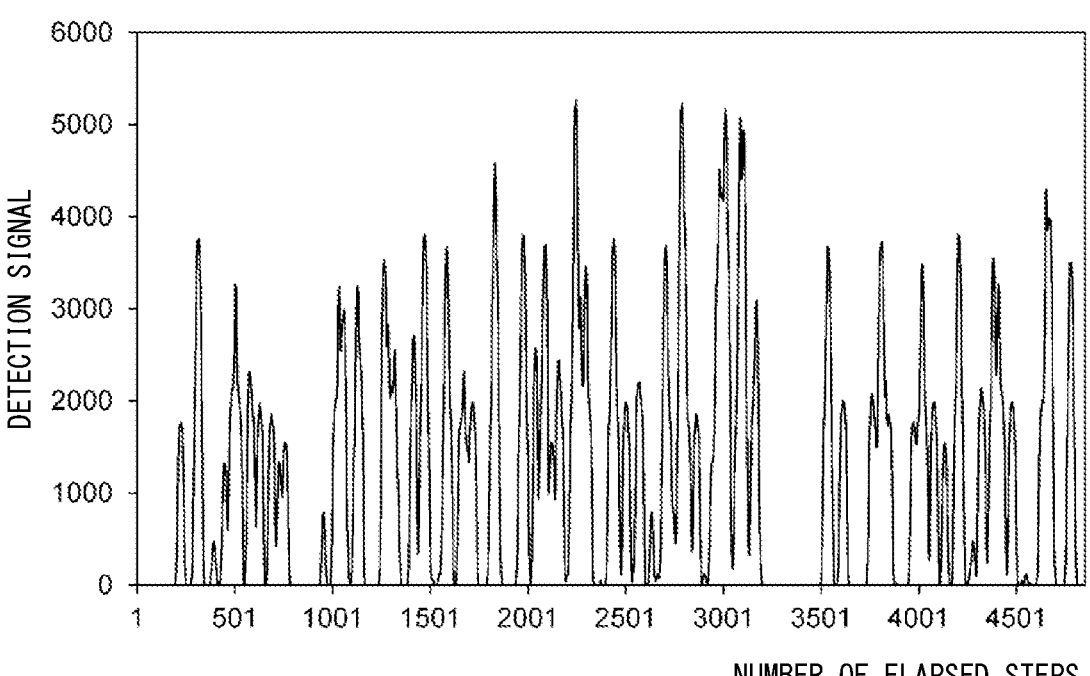

Next, an allowable range for the relative intensity RI for maintaining the cell classification performance was confirmed through simulation. FIGS. 9, 10 are each a graph showing a result of simulation in which the difference in waveform of the detection signal when the relative intensity RI was different was studied. In the simulation, the relative intensity RI of the zero-order diffracted light was changed to 46 times, 10 times, 5 times, and 1 times.

In this simulation, first, a map in which the same distribution pattern of diffracted lights as that in the image shown in the lower part of FIG. 4 was reproduced in terms of pixel values was created. Specifically, a map having squares as shown in FIG. 5 was created using spreadsheet software, 1 was inputted to squares corresponding to white light spots in the image in FIG. 4, and 0 was inputted to black regions. In the square corresponding to the zero-order diffracted light, 46, 10, 5, or 1 was inputted in accordance with the relative intensity RI. Next, a bead image created in advance was superposed on this map, the inner product of the pixel value of the squares and the pixel value of the bead image in the overlapping range was calculated, and this was used as the value of the detection signal. This calculation was repeated every time the position of the bead image was moved from left to right by one pixel in each step, whereby a waveform of the detection signal in time series was created. In each graph in FIGS. 9, 10, a waveform in which the detection signal changes in time series is shown. In each graph, the vertical axis represents the intensity of the detection signal, and the horizontal axis represents the number of elapsed steps corresponding to the elapsed time. The left end and the right end in the graph respectively show the detection signals acquired when the bead was positioned at the left end and the right end of the irradiation range R. That is, the elapsed time on the horizontal axis corresponds to the position of a cell moving in the Z-axis positive direction.

The graph in the upper part of FIG. 9 shows a detection signal when the relative intensity RI of the zero-order diffracted light was set to 46 times, that is, a detection signal when the intensity value of the zero-order diffracted light was set to 46 and the intensity value of the other diffracted light was set to 1. In this case, the light intensity caused by the zero-order diffracted light was significantly larger than the light intensity caused by the other diffracted light. Thus, at the timing when the zero-order diffracted light was applied to the bead, the detection signal having a significantly high intensity was detected. If a detector, and an amplifier and an A/D conversion circuit in a later stage are configured so as to detect the detection signal having a significantly high intensity like this, the signal resolving power for the detection signal having a low intensity according to the other diffracted light is significantly reduced when the detection signal is sampled from an analog signal and converted into a digital signal. Specifically, when all the gradations for the digital signal are provided as 256 gradations, 5 to 256 gradations on the high value side are used only for the detection signal according to the zero-order diffracted light, and only very narrow gradations such as 1 to 5 gradations on the low value side are used for the detection signal according to the other diffracted light. Therefore, it becomes difficult to perform cell classification by the AI algorithm using the other diffracted light other than the zero-order diffracted light.

The graph in the lower part of FIG. 9 shows a detection signal when the relative intensity RI was set to 10 times, that is, a detection signal when the intensity value of the zero-order diffracted light was set to 10, and the intensity value of the other diffracted light was set to 1. In this case, as compared with the graph in the upper part of FIG. 9, the difference between the light intensity caused by the zero-order diffracted light and the light intensity caused by the other diffracted light was reduced. If a detector, and an amplifier and an A/D conversion circuit in a later stage are configured so as to detect the detection signal having a relative intensity of about 10 times like this, the signal resolving power for the detection signal having a low intensity according to the other diffracted light is maintained to a certain extent also when the detection signal is sampled from an analog signal and converted into a digital signal. Specifically, when all the gradations for the digital signal are provided as 256 gradations, although 26 to 256 gradations on the high value side are used only for the detection signal according to the zero-order diffracted light, gradations such as 1 to 25 gradations on the low value side can be used for the detection signal according to the other diffracted light. When a signal resolving power of about 25 gradations is available for the other diffracted light other than the zero-order diffracted light, it becomes possible to classify cells at a certain accuracy or higher by the AI algorithm.

The graph in the upper part of FIG. 10 shows a detection signal when the relative intensity RI was set to 5 times, that is, a detection signal when the intensity value of the zero-order diffracted light was set to 5 and the intensity value of the other diffracted light was set to 1. In this case, as compared with the graph in the lower part of FIG. 9, the difference between the light intensity caused by the zero-order diffracted light and the light intensity caused by the other diffracted light was further reduced. If a detector, and an amplifier and an A/D conversion circuit in a later stage are configured so as to detect the detection signal having a relative intensity of about 5 times like this, when all the gradations for the digital signal are provided as 256 gradations, although 51 to 256 gradations on the high value side are used only for the detection signal according to the zero-order diffracted light, gradations such as 1 to 50 gradations on the low value side can be used for the detection signal according to the other diffracted light. Therefore, it becomes possible to classify cells at a higher accuracy by the AI algorithm.

The graph in the lower part of FIG. 10 shows a detection signal when the relative intensity RI was set to 1 times, that is, a detection signal when the intensity values of the zero-order diffracted light and the other diffracted light were set to 1. If a detector, and an amplifier and an A/D conversion circuit in a later stage are configured so as to detect the detection signal having a relative intensity of about 1 times like this, when all the gradations for the digital signal are provided as 256 gradations, all of the 256 gradations can be used for the detection signal according to the other diffracted light. Therefore, it becomes possible to classify cells at a further higher accuracy by the AI algorithm.

Figure 11:
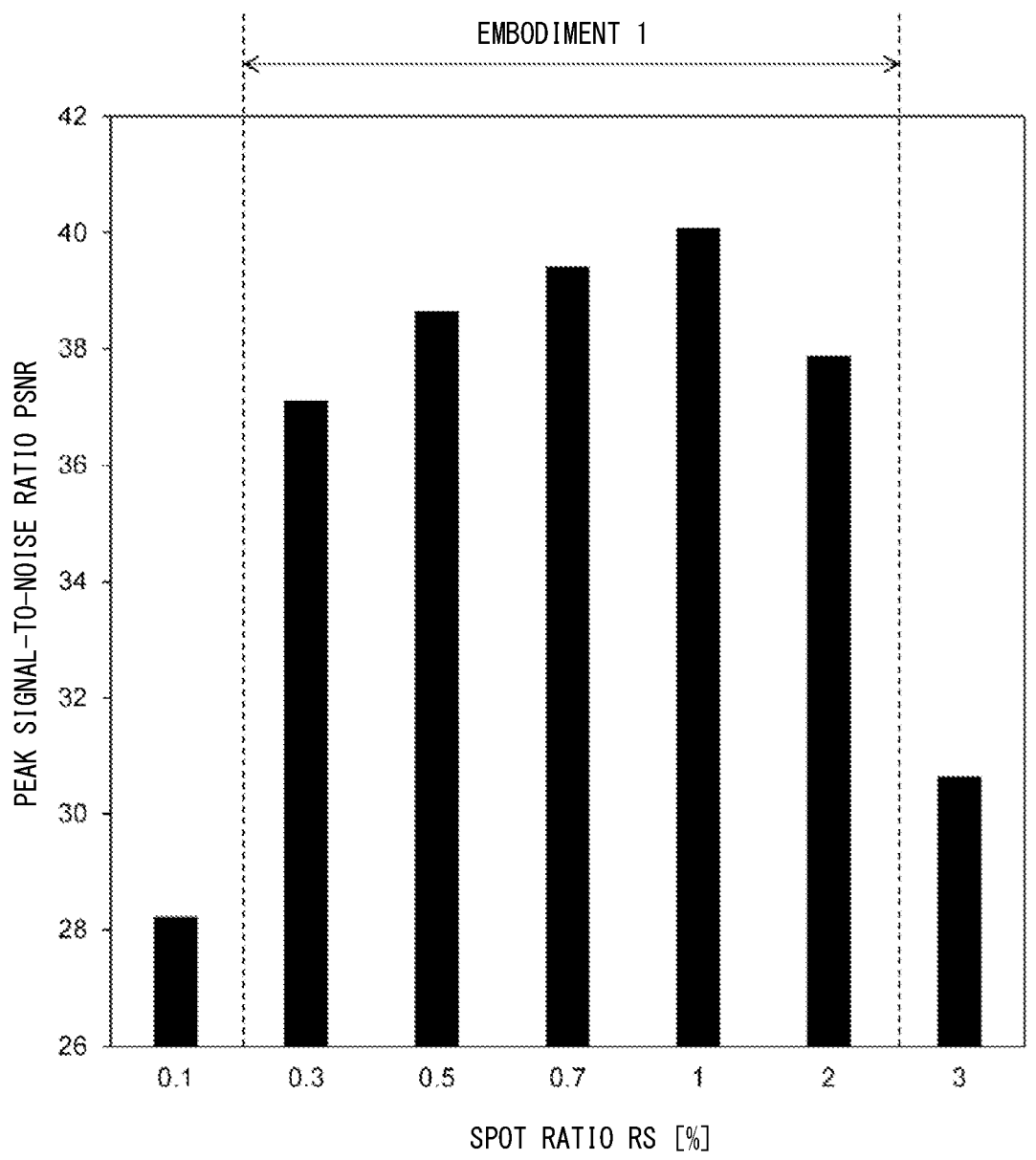
FIG. 11 shows a result of simulation regarding performance of a diffractive optical element when the spot ratio of other diffracted lights was changed, according to Embodiment 1.

Next, with reference to FIG. 11, a result of simulation regarding the performance of the diffractive optical element 114 when the spot ratio RS of the other diffracted light was changed is described.

In this simulation, a fluorescence image of a bead was used as the measurement target, and the relative intensity RI of the zero-order diffracted light was set to 1 times. As the spot ratio RS of the other diffracted light, 0.1%, 0.3%, 0.5%, 0.7%, 1%, 2%, and 3% were used. At each spot ratio RS, using 1000 types of the diffractive optical elements 114 for generating illumination lights having distribution patterns different from each other, detection signals from the light receiver 143 based on fluorescence were generated from the measurement target (bead) and the distribution patterns of the illumination light. An original bead image (fluorescence image) was recovered from the generated detection signal and the distribution pattern of the illumination light, and a PSNR (peak signal-to-noise ratio) was calculated as an index corresponding to the signal amount of the detection signal. The PSNR is an index that indicates how accurately the bead image can be recovered. When a detection signal having a high PSNR is used, it can be expected that cell classification is more accurately performed in Ghost Cytometry (registered trademark).

FIG. 11 is a graph showing the maximum value of the PSNR for each spot ratio RS. In the graph in FIG. 11, the horizontal axis represents the spot ratio RS, and the vertical axis represents the maximum value of the PSNR based on the 1000 types of the diffractive optical elements 114.

As shown in the graph in FIG. 11, the maximum value of the PSNR when the spot ratio RS was not less than 0.3% and not greater than 2% was significantly larger than the maximum value of the PSNR when the PSNR was 0.1% or 3%. From this, it is understood that, in a case where the diffractive optical element 114 for which the PSNR takes the maximum value is used, if the spot ratio RS is set to not less than 0.3% and not greater than 2%, the signal amount of the detection signal can be effectively increased, and the bead image can be accurately recovered. When the spot ratio RS is set to 1%, the maximum value of the PSNR was able to be set to be the highest. Therefore, the spot ratio RS is set to preferably not less than 0.3% and not greater than 2%, and further preferably 1%.

<Effects of Optical System and Specimen Analyzer According to Embodiment 1>

As shown in FIG. 3, the irradiation optical system IS includes the diffractive optical element 114 on which light from the light source 111 is incident, and illumination light (see FIGS. 4, 5) in which a plurality of diffracted lights including zero-order diffracted light generated by the diffractive optical element 114 are distributed in a predetermined distribution pattern is applied to the flow cell 101. The light receivers 123, 133, 143 receive light generated from a cell flowing in the flow cell 101, upon application of the illumination light including the plurality of diffracted lights including the zero-order diffracted light. The irradiation optical system IS does not include a configuration for blocking the zero-order and multi-order diffracted lights.

The downsizing effect due to non-provision of the configuration for blocking the zero-order and multi-order diffracted lights is described. In the cell analyzer according to Japanese Laid-open Patent Publication No. 2021-530715, in order to block a diffraction pattern including zero-order and multi-order diffracted lights, two lenses for causing image formation of structured illumination once between the diffractive optical elements and the objective lens are provided. The focal lengths of the two lenses used in Japanese Laid-open Patent Publication No. 2021-530715 are each 150 mm. That is, in Japanese Laid-open Patent Publication No. 2021-530715, it is necessary to ensure 300 mm only by the distance between the two lenses between the diffractive optical elements and the objective lens. Meanwhile, in the experimental apparatus according to the trial by the inventors, the distance between the diffractive optical element 114 and the condenser lens 115 shown in FIG. 3 is about 20 mm, and the distance between the DOE and the objective lens can be reduced to not greater than ¹⁄₁₅ as compared with that in the optical system of Japanese Laid-open Patent Publication No. 2021-530715. In addition, the distance between the lenses in Japanese Laid-open Patent Publication No. 2021-530715 is 300 mm, whereas the size in the X-axis direction of the entirety of the optical system of the experimental apparatus is about 350 mm. Therefore, it is possible to say that significant downsizing was able to be realized.

Embodiment 2

The optical system 100 of Embodiment 2 further includes a configuration for receiving light generated when other light not via the diffractive optical element 114 is applied to a cell.

Figure 12:
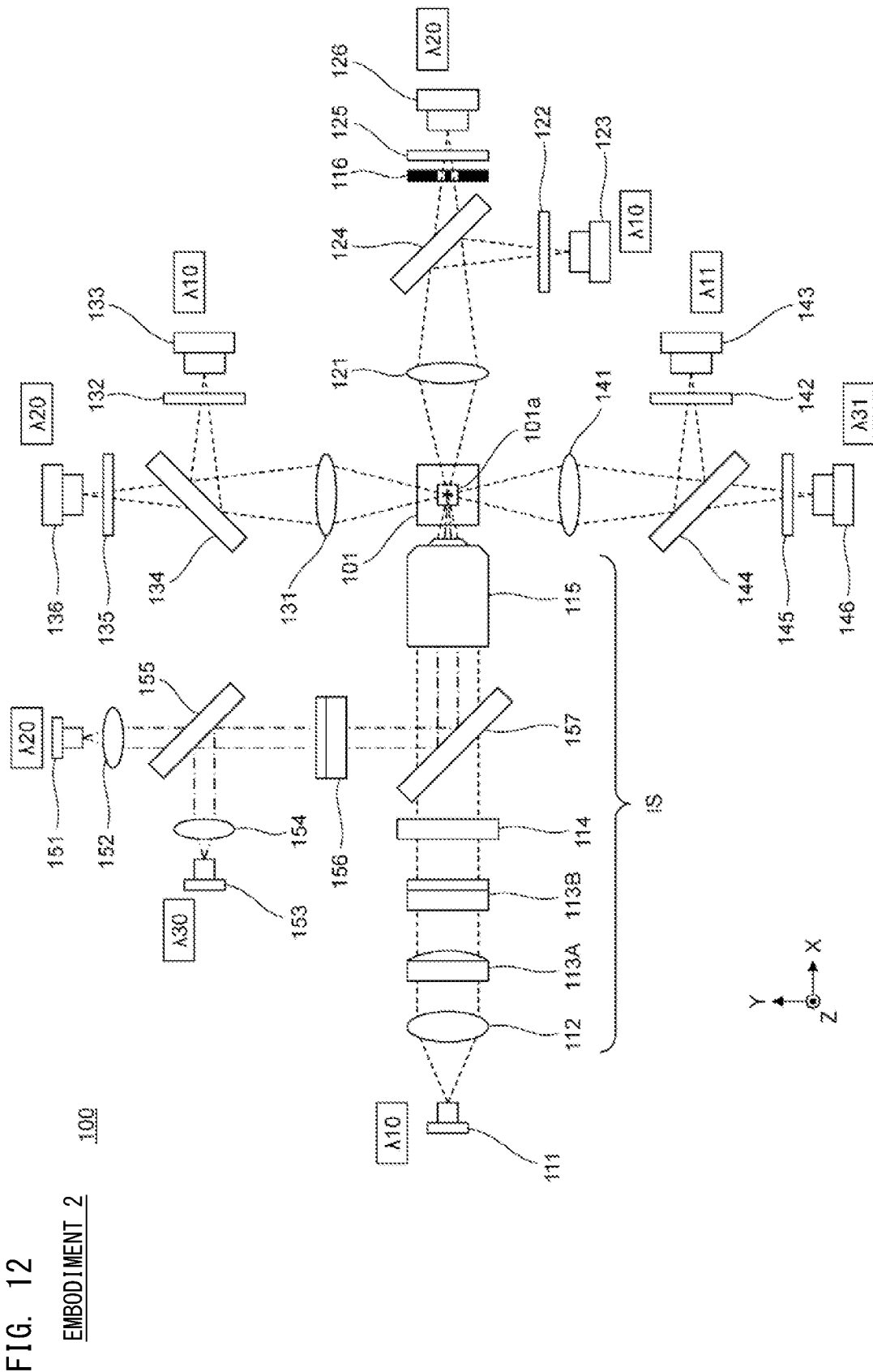
FIG. 12 schematically shows a configuration of an optical unit according to Embodiment 2.

FIG. 12 schematically shows a configuration of the optical system 100 according to Embodiment 2.

As compared with the optical system 100 of Embodiment 1 shown in FIG. 3, the optical system 100 of Embodiment 2 includes a light source 151, a collimator lens 152, a light source 153, a collimator lens 154, a dichroic mirror 155, a cylindrical lens 156, a dichroic mirror 157, dichroic mirrors 124, 134, 144, optical filters 125, 135, 145, light receivers 126, 136, 146, and a beam stopper 116. The dichroic mirror 157 is included in the irradiation optical system IS. In the following, differences from Embodiment 1 are described.

The light sources 151, 153 are each a semiconductor laser light source, for example. The light source 151 emits light having a predetermined wavelength λ20 in the Y-axis negative direction, and the light source 153 emits light having a predetermined wavelength 230 in the X-axis positive direction. The wavelength λ20 is 642 nm, for example. The wavelength 230 is 488 nm, for example. The collimator lenses 152, 154 respectively convert lights emitted from the light sources 151, 153 into parallel lights. The dichroic mirror 155 allows the light having the wavelength λ20 from the light source 151 to be transmitted therethrough, and reflects the light having the wavelength λ30 from the light source 153. Due to the dichroic mirror 155, the optical axes of the lights from the light sources 151, 153 are aligned with each other.

The cylindrical lens 156 converges the lights from the dichroic mirror 155 in the Z-axis direction, and causes the lights to have a flat shape at the position of the flow cell 101. The dichroic mirror 157 allows the light having the wavelength λ10 from the light source 111 to be transmitted therethrough, and reflects the light having the wavelength λ20 from the light source 151 and the light having the wavelength 230 from the light source 153. Due to the dichroic mirror 157, the optical axes of the lights from the light sources 151, 153 and the central axis of the illumination light from the diffractive optical element 114 are aligned with each other.

The condenser lens 115 condenses the lights from the light sources 111, 151, 153, onto the flow path 101a of the flow cell 101. The condenser lens 115 is configured to suppress chromatic aberration with respect to the lights having the wavelengths λ10, λ20, λ30. Due to the action of the cylindrical lens 156, the lights from the light sources 151, 153, while having a flat shape whose width in the Z-axis direction is small, are applied to the flow path 101a of the flow cell 101.

When the lights from the light sources 151, 153 are applied to a cell flowing in the flow cell 101, forward scattered light, side scattered light, and fluorescence are generated from the portion of the cell to which the lights have been applied. Here, it is assumed that, when the light having the wavelength λ30 is applied to another fluorescent dye staining the cell, light having a wavelength λ31 is generated from the other fluorescent dye.

The condenser lens 121 condenses forward scattered light having the wavelength λ20 generated from the cell, onto the light receiver 126. The dichroic mirror 124 reflects forward scattered light having the wavelength λ10, and allows forward scattered light having the wavelength λ20 to be transmitted therethrough. The beam stopper 116 blocks light having the wavelength λ20 and transmitted through the flow cell 101 without being applied to the cell, and allows forward scattered light having the wavelength λ20 generated from the cell to pass therethrough. The optical filter 125 is configured to allow only light having the wavelength λ20 to be transmitted therethrough. The light receiver 126 receives the forward scattered light having the wavelength λ20 and transmitted through the optical filter 125, and outputs a detection signal according to the intensity of the received light. The light receiver 126 is a photodiode (PD), for example.

The condenser lens 131 condenses side scattered light having the wavelength λ10 generated from the cell, onto the light receiver 133, and condenses side scattered light having the wavelength λ20 generated from the cell, onto the light receiver 136. The dichroic mirror 134 reflects side scattered light having the wavelength λ10 and allows side scattered light having the wavelength λ20 to be transmitted therethrough. The optical filter 135 is configured to allow only light having the wavelength λ20 to be transmitted therethrough. The light receiver 136 receives the side scattered light having the wavelength λ20 and transmitted through the optical filter 135, and outputs a detection signal according to the intensity of the received light. The light receiver 136 is a photodiode (PD), for example.

The condenser lens 141 condenses fluorescence having the wavelength λ11 generated from the cell, onto the light receiver 143, and condenses fluorescence having the wavelength 231 generated from the cell, onto the light receiver 146. The dichroic mirror 144 reflects fluorescence having the wavelength λ11 and allows fluorescence having the wavelength λ31 to be transmitted therethrough. The optical filter 145 is configured to allow only light having the wavelength 231 to be transmitted through. The light receiver 146 receives the fluorescence having the wavelength λ31 and transmitted through the optical filter 145, and outputs a detection signal according to the intensity of the received light. The light receiver 146 is a photomultiplier (PMT), for example.

In Embodiment 2, on the basis of the detection signals from the light receivers 126, 136, 146, a scattergram or a histogram is generated for each sample, and on the basis of the generated scattergram or histogram, cells are classified.

Effects of Optical System and Specimen Analyzer According to Embodiment 2

As shown in FIG. 12, the irradiation optical system IS further includes the dichroic mirror 157 (alignment optical element) which aligns another light emitted from the light source 151, 153 (another light source), with the illumination light. The optical system 100 further includes: the dichroic mirror 124, 134, 144 (separation optical element) which separates light generated from a cell due to the other light and light generated from the cell due to the illumination light from each other; and the light receiver 126, 136, 146 (another light receiver) which receives the light based on the other light separated by the dichroic mirror 124, 134, 144 (separation optical element).

With this configuration, optical information of the cell due to the other light emitted from the light source 151, 153 can be further acquired, and thus, the specimen analyzer 1 can perform various analyses.

As shown in FIG. 12, the light sources 151, 153 and the configuration for receiving lights generated from the cell due to the lights from the light sources 151, 153 are disposed in the space between the light source 111 and the configuration for receiving light generated from the cell due to the light from the light source 111. Therefore, with the optical system 100 of Embodiment 2, the optical system 100 can be configured to be small while including the above two types of configurations.

The light from the light source 111 and the lights from the light sources 151, 153 are simultaneously applied to the flow path 101a of the flow cell 101. Therefore, using one sample, detection signals from the light receivers 123, 133, 143 and detection signals from the light receivers 126, 136, 146 can be simultaneously acquired. Since these detection signals can be simultaneously acquired, analysis by the AI algorithm 32 based on the detection signals from the light receivers 123, 133, 143, and analysis according to a scattergram or a histogram based on the detection signals from the light receivers 126, 136, 146 can be simultaneously performed. Therefore, the time for the two types of analysis can be shortened.

Embodiment 3

In Embodiment 2, the configuration for receiving light generated from a cell due to the light from the light source 111 and the configuration for receiving lights generated from the cell due to the lights from the light sources 151, 153 are disposed in the optical system 100 of a single specimen analyzer 1. In contrast to this, in Embodiment 3, these two configurations are disposed in separate specimen analyzers, and these two specimen analyzers and another analyzer are connected to each other by a transport apparatus.

Figure 13:
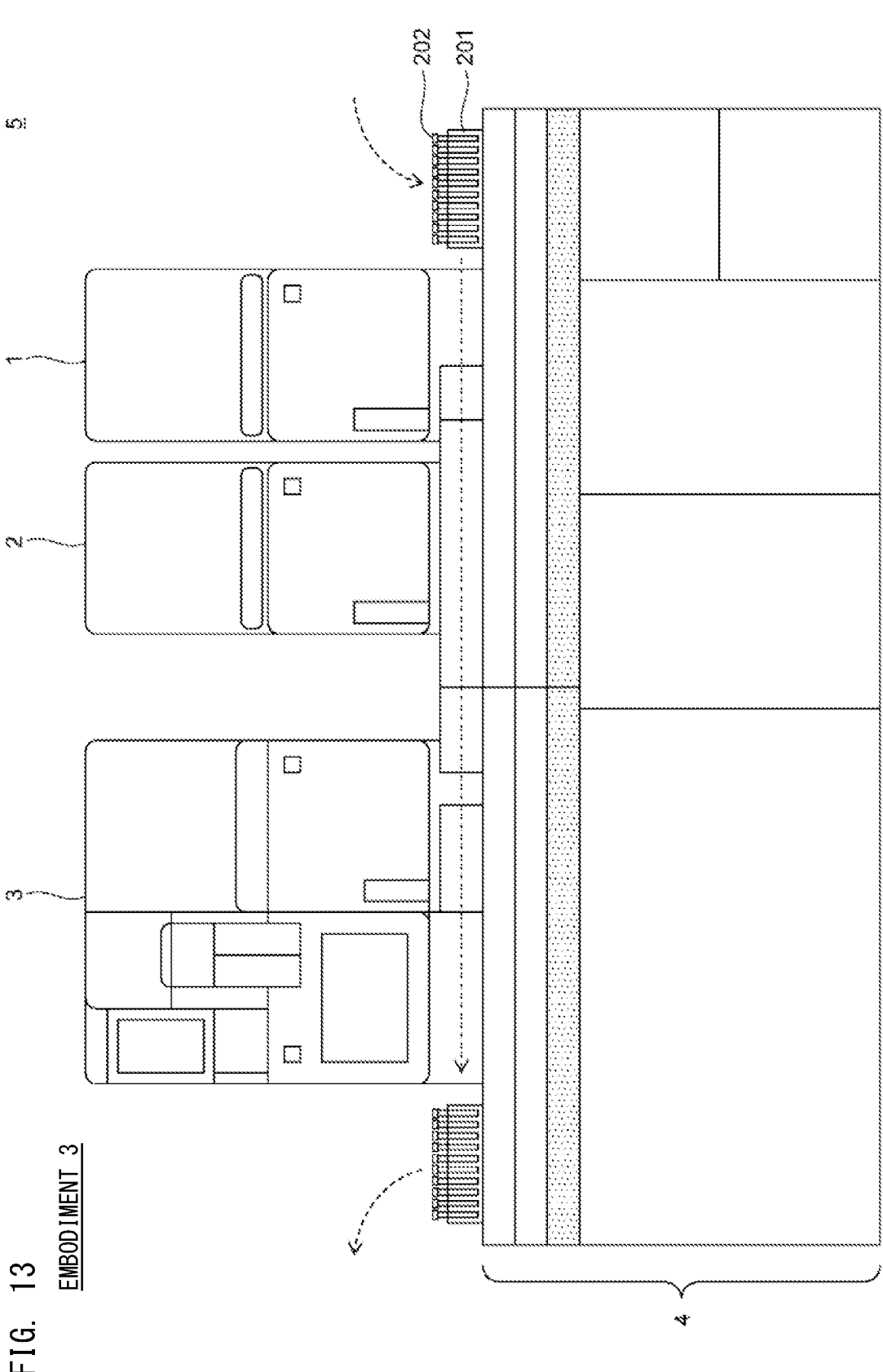
FIG. 13 is a side view schematically showing a configuration of a specimen processing system according to Embodiment 3.

FIG. 13 is a side view schematically showing a configuration of a specimen processing system 5.

The specimen processing system 5 includes the specimen analyzers 1, 2, a smear preparation apparatus 3, and a transport apparatus 4.

The specimen analyzer 1 of Embodiment 3 has a configuration similar to that of the specimen analyzer 1 of Embodiment 1. The specimen analyzer 2 is a specimen analyzer in which the configuration for receiving light generated from a cell due to the light from the light source 111 is omitted from the specimen analyzer 2 of Embodiment 2. The specimen analyzer 2 includes an optical system 300 in place of the optical system 100 as compared with the specimen analyzer 1 of Embodiment 2. The optical system 300 will be described later with reference to FIG. 14. The smear preparation apparatus 3 is an apparatus that prepares a smear from a blood specimen. The transport apparatus 4 is disposed so as to extend across the specimen analyzers 1, 2 and the smear preparation apparatus 3, and transports specimen containers 202 held in a specimen rack 201, to each apparatus.

The transport apparatus 4 transports, in the left direction, the specimen rack 201 placed at the right end of the transport apparatus 4 by an operator, and positions a specimen container 202 to the front of the specimen analyzers 1, 2 and the smear preparation apparatus 3.

The specimen analyzer 1 reads a bar code by means of the reading part 16 (see FIG. 1) from a label attached to a specimen container 202. The specimen analyzer 1 measures a specimen in the specimen container 202 and performs cell classification by the AI algorithm 32 on the basis of detection signals. The specimen analyzer 2 reads a bar code by means of the reading part 16 from a label attached to a specimen container 202. The specimen analyzer 2 measures a specimen in the specimen container 202 and performs cell classification based on a scattergram or a histogram on the basis of detection signals. The smear preparation apparatus 3 reads a bar code from a label attached to a specimen container 202, and prepares a smear from a specimen in the specimen container 202. The specimen rack 201 transported to the left end of the transport apparatus 4 is taken out by the operator.

Figure 14:
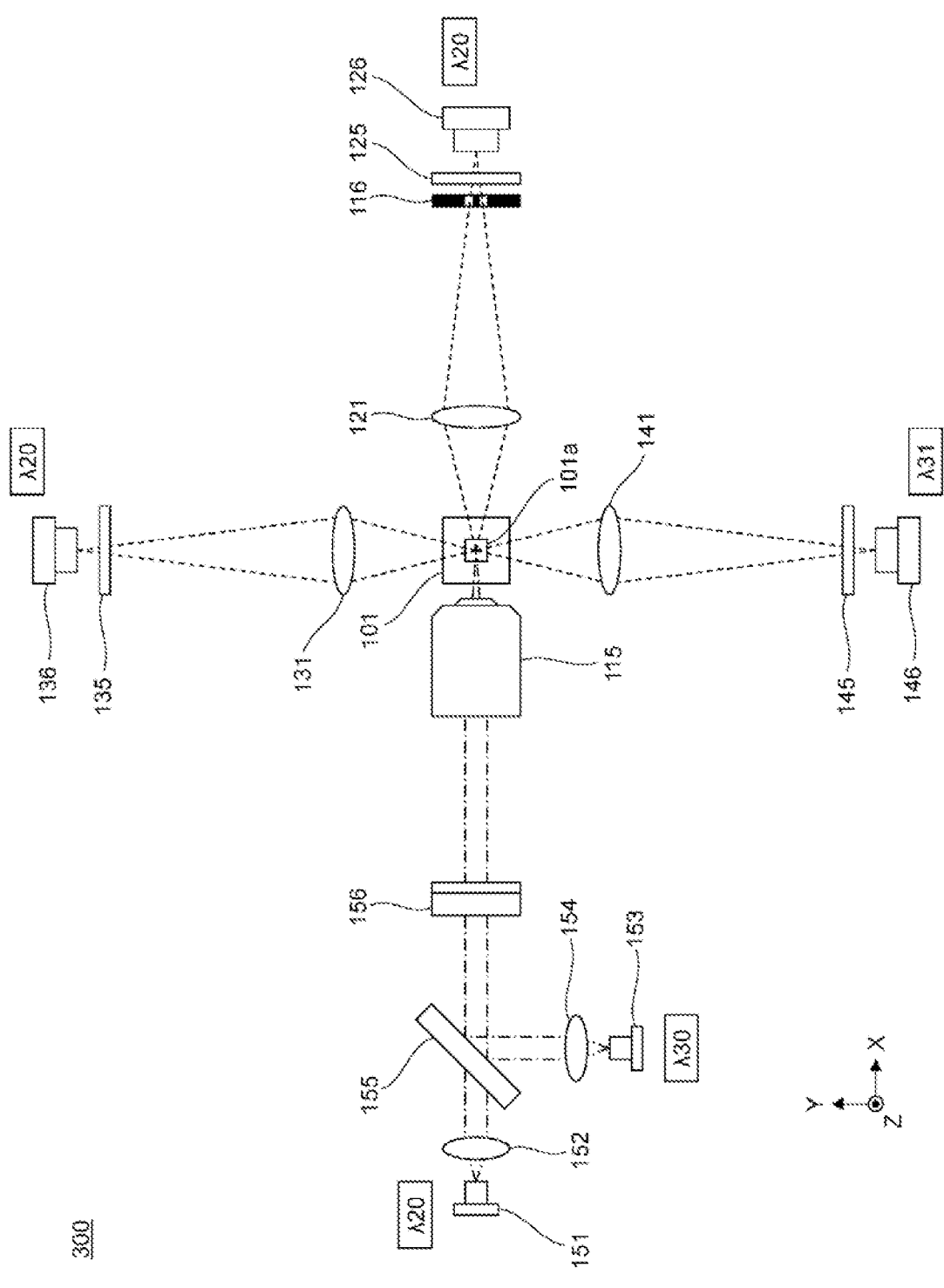
FIG. 14 schematically shows a configuration of an optical system of another specimen analyzer according to Embodiment 3.

FIG. 14 schematically shows a configuration of the optical system 300 of the specimen analyzer 2.

In the optical system 300, as compared with the optical system 100 of Embodiment 2 shown in FIG. 12, the light source 111, the collimator lens 112, the cylindrical lenses 113A, 113B, the diffractive optical element 114, the dichroic mirror 157, the optical filters 122, 132, 142, the light receivers 123, 133, 143, and the dichroic mirrors 124, 134, 144 are omitted. The light source 151 emits light in the X-axis positive direction, the light source 153 emits light in the Y-axis positive direction, and the advancing directions of the lights from the light sources 151, 153 are aligned with the X-axis positive direction by the dichroic mirror 155.

Effects of Optical System and Specimen Analyzer According to Embodiment 3

According to Embodiment 3, the specimen containers 202 held in the specimen rack 201 are supplied to the specimen analyzers 1, 2 and the smear preparation apparatus 3 by the transport apparatus 4. Therefore, specimens can be smoothly supplied to the apparatuses as necessary. Thus, specimen analysis by the specimen analyzers 1, 2 and smear preparation can be quickly performed.

Modification

In Embodiments 1 to 3 above, the diffractive optical element 114 may have a condensing action. In this case, for example, the diffraction pattern itself formed at the diffractive optical element 114 may have a condensing action, or a diffraction pattern for generating diffracted light may be formed at the incidence surface of the diffractive optical element 114 and a pattern having a lens effect or a Fresnel lens may be formed on the light-outputting surface of the diffractive optical element 114. When the diffractive optical element 114 has a condensing action, the condenser lens 115 may be omitted.

In Embodiments 1 to 3 above, the diffractive optical element 114 is a transmission-type diffractive optical element, but may be a reflection-type diffractive optical element.

In Embodiments 1 to 3 above, the calculation part 11 of the specimen analyzer 1 classifies a cell by the AI algorithm 32 on the basis of the detection signal from the light receiver 123, 133, 143. However, not limited thereto, the pattern of the detection signal from the light receiver 123, 133, 143 may be collated with a pattern stored in the storage 12 in advance, whereby the cell may be classified.

Various modifications can be made as appropriate to the embodiments of the present invention, without departing from the scope of the technological idea defined by the claims.

[Remarks]

The present disclosure includes following items 1-18.

Item 1: An optical system comprising:
a light source configured to emit light;
an irradiation optical system including a diffractive optical element on which the light is incident, the irradiation optical system being configured to apply illumination light in which a plurality of diffracted lights generated by the diffractive optical element are distributed;
a flow cell in which a sample containing cells is caused to flow to a position at which the illumination light is applied by the irradiation optical system; and
a light receiver configured to receive light generated from each cell flowing in the flow cell, upon application of the illumination light by the irradiation optical system, wherein
the illumination light includes zero-order diffracted light whose relative intensity relative to another diffracted light is not greater than 10 times, and
the irradiation optical system applies the illumination light including the zero-order diffracted light to a position through which the cell in the flow cell passes.

Item 2: The optical system according to item 1, wherein the irradiation optical system condenses the illumination light generated from the diffractive optical element, onto the flow cell, and
the relative intensity is a value of a ratio between a light amount of the zero-order diffracted light and a light amount of the other diffracted light at a light condensing surface of the illumination light.

Item 3: The optical system according to item 2, wherein the light amount of the other diffracted light is a representative value of light amounts of at least some spots out of a plurality of spots formed by the other diffracted light.

Item 4: The optical system according to item 3, wherein the representative value is a maximum value, an average value, a median, or a mode.

Item 5: The optical system according to item 1, wherein when an intensity of incident light incident on the diffractive optical element is defined as L0, an intensity of the zero-order diffracted light is defined as L1, an intensity of the other diffracted light other than the zero-order diffracted light is defined as L2, a ratio of the intensity of the zero-order diffracted light generated from the diffractive optical element relative to the intensity of the incident light is defined as R1, a diffraction efficiency of the diffractive optical element is defined as R2, and the number of the other diffracted light included in the illumination light is defined as N, the intensity L1 of the zero-order diffracted light is represented by formula (1) below, the intensity L2 of the other diffracted light is represented by formula (2) below, and the relative intensity is represented by L1/L2:

$$L1 = L0 \times R1 \qquad (1); \text{ and}$$

$$L2 = (L0 - L1) \times R2/N \qquad (2).$$

Item 6: The optical system according to item 1, wherein the relative intensity of the zero-order diffracted light relative to the other diffracted light included in the illumination light is not greater than 1 times.

Item 7: The optical system according to item 1, wherein a ratio of the number of regions in which the other diffracted light other than the zero-order diffracted light is included, relative to the number of a plurality of regions, in the illumination light, having a grid shape including regions in each of which one said diffracted light is included and regions in each of which the diffracted light is not included is not less than 0.3% and not greater than 2%.

Item 8: The optical system according to item 1, wherein when a region, in the illumination light, in which one said diffracted light is included is defined as one pixel, a length of the illumination light in a flow direction of the sample in the flow cell is not less than 300 pixels.

Item 9: The optical system according to item 1, wherein the light receiver receives scattered light generated from the cell flowing in the flow cell.

Item 10: The optical system according to item 1, wherein the light receiver receives fluorescence generated from the cell flowing in the flow cell.

Item 11: The optical system according to item 1, wherein the irradiation optical system further comprises an alignment optical element configured to align another light emitted from another light source, with the illumination light, and the optical system further comprises: a separation optical element configured to separate light generated from the cell due to the other light and the light generated from the cell due to the illumination light from each other; and another light receiver configured to receive the light based on the other light separated by the separation optical element.

Item 12: A specimen analyzer comprising: a sample preparation part configured to mix a specimen containing cells and a reagent to prepare a sample; a light source configured to emit light; an irradiation optical system including a diffractive optical element on which the light is incident, the irradiation optical system being configured to apply illumination light in which a plurality of diffracted lights generated by the diffractive optical element are distributed; a flow cell in which the sample containing the cells is caused to flow to a position at which the illumination light is applied by the irradiation optical system; a light receiver configured to receive light generated from each cell flowing in the flow cell, upon application of the illumination light by the irradiation optical system; and a controller programmed to classify the cell on the basis of a signal from the light receiver, wherein the illumination light includes zero-order diffracted light whose relative intensity relative to a plurality of other diffracted lights is not greater than 10 times, and the irradiation optical system applies the illumination light including the zero-order diffracted light to a position through which the cell in the flow cell passes.

Item 13: The specimen analyzer according to item 12, wherein the irradiation optical system comprises a condenser lens configured to condense the diffracted lights generated from the diffractive optical element, onto the flow cell.

Item 14: The specimen analyzer according to item 12, wherein the light receiver receives scattered light generated from the cell flowing in the flow cell.

Item 15: The specimen analyzer according to item 12, wherein the light receiver receives fluorescence generated from the cell flowing in the flow cell.

Item 16: The specimen analyzer according to item 12, wherein the irradiation optical system further comprises an alignment optical element configured to align another light emitted from another light source, with the illumination light, and the specimen analyzer further comprises: a separation optical element configured to separate light generated from the cell due to the other light and the light generated from the cell due to the illumination light from each other; and another light receiver configured to receive the light based on the other light separated by the separation optical element.

Item 17: The specimen analyzer according to item 12, wherein the specimen is one of blood, spinal fluid, bone marrow aspirate, and celomic fluid.

Item 18: The specimen analyzer according to item 12, wherein the reagent includes a hemolytic agent.

What is claimed is:
1. An optical system comprising:
a light source configured to emit light;
an irradiation optical system including a diffractive optical element on which the light is incident, the irradiation optical system being configured to apply illumi- nation light in which a plurality of diffracted lights generated by the diffractive optical element are distributed;

a flow cell in which a sample containing cells is caused to flow to a position at which the illumination light is applied by the irradiation optical system; and a light receiver configured to receive light generated from each cell flowing in the flow cell, upon application of the illumination light by the irradiation optical system, wherein the illumination light includes zero-order diffracted light whose relative intensity relative to another diffracted light is not greater than 10 times, and the irradiation optical system applies the illumination light including the zero-order diffracted light to a position through which the cell in the flow cell passes.

2. The optical system according to claim 1, wherein the irradiation optical system condenses the illumination light generated from the diffractive optical element, onto the flow cell, and the relative intensity is a value of a ratio between a light amount of the zero-order diffracted light and a light amount of the other diffracted light at a light condensing surface of the illumination light.

3. The optical system according to claim 2, wherein the light amount of the other diffracted light is a representative value of light amounts of at least some spots out of a plurality of spots formed by the other diffracted light.

4. The optical system according to claim 3, wherein the representative value is a maximum value, an average value, a median, or a mode.

5. The optical system according to claim 1, wherein when an intensity of incident light incident on the diffractive optical element is defined as $L0$, an intensity of the zero-order diffracted light is defined as $L1$, an intensity of the other diffracted light other than the zero-order diffracted light is defined as $L2$, a ratio of the intensity of the zero-order diffracted light generated from the diffractive optical element relative to the intensity of the incident light is defined as $R1$, a diffraction efficiency of the diffractive optical element is defined as $R2$, and the number of the other diffracted light included in the illumination light is defined as N, the intensity $L1$ of the zero-order diffracted light is represented by formula (1) below, the intensity $L2$ of the other diffracted light is represented by formula (2) below, and the relative intensity is represented by $L1/L2$:

$$L1=L0 \times R1 \tag{1); and}$$

$$L2=(L0-L1) \times R2/N \tag{2).}$$

6. The optical system according to claim 1, wherein the relative intensity of the zero-order diffracted light relative to the other diffracted light included in the illumination light is not greater than 1 times.

7. The optical system according to claim 1, wherein a ratio of the number of regions in which the other diffracted light other than the zero-order diffracted light is included, relative to the number of a plurality of regions, in the illumination light, having a grid shape including regions in each of which one said diffracted light is included and regions in each of which the diffracted light is not included is not less than 0.3% and not greater than 2%.

8. The optical system according to claim 1, wherein when a region, in the illumination light, in which one said diffracted light is included is defined as one pixel, a length of the illumination light in a flow direction of the sample in the flow cell is not less than 300 pixels.

9. The optical system according to claim 1, wherein the light receiver receives scattered light generated from the cell flowing in the flow cell.

10. The optical system according to claim 1, wherein the light receiver receives fluorescence generated from the cell flowing in the flow cell.

11. The optical system according to claim 1, wherein the irradiation optical system further comprises an alignment optical element configured to align another light emitted from another light source, with the illumination light, and the optical system further comprises:

a separation optical element configured to separate light generated from the cell due to the other light and the light generated from the cell due to the illumination light from each other; and another light receiver configured to receive the light based on the other light separated by the separation optical element.

*   *   *   *   *